United States Patent
Novak et al.

(10) Patent No.: US 10,621,350 B2
(45) Date of Patent: Apr. 14, 2020

(54) SYSTEM INTEGRITY USING ATTESTATION FOR VIRTUAL TRUSTED PLATFORM MODULE

(71) Applicant: Microsoft Technology Licensing, LLC, Redmond, WA (US)

(72) Inventors: Mark Fishel Novak, Newcastle, WA (US); Yevgeniy A. Samsonov, Redmond, WA (US); Jingbo Wu, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 320 days.

(21) Appl. No.: 15/722,439

(22) Filed: Oct. 2, 2017

(65) Prior Publication Data
US 2019/0102555 A1 Apr. 4, 2019

(51) Int. Cl.
| | | |
|---|---|---|
| H04L 29/06 | (2006.01) | |
| G06F 21/57 | (2013.01) | |
| G06F 21/33 | (2013.01) | |
| H04L 9/32 | (2006.01) | |
| H04L 9/08 | (2006.01) | |
| G06F 21/53 | (2013.01) | |

(52) U.S. Cl.
CPC ............ *G06F 21/57* (2013.01); *G06F 21/33* (2013.01); *G06F 21/53* (2013.01); *H04L 9/0897* (2013.01); *H04L 9/3268* (2013.01); *H04L 63/0823* (2013.01); *G06F 2221/2103* (2013.01); *G06F 2221/2115* (2013.01); *G06F 2221/2117* (2013.01); *G06F 2221/2129* (2013.01)

(58) Field of Classification Search
CPC .......... G06F 21/57; G06F 21/33; G06F 21/53; G06F 2221/2115; H04L 9/3268; H04L 63/0823; H04L 9/0897
See application file for complete search history.

(56) References Cited

U.S. PATENT DOCUMENTS

| | | | | |
|---|---|---|---|---|
| 8,826,013 | B1 * | 9/2014 | Kodukula | G06F 21/53 380/279 |
| 2006/0020781 | A1 * | 1/2006 | Scarlata | G06F 21/53 713/100 |
| 2006/0256108 | A1 * | 11/2006 | Scaralata | G06F 21/57 345/418 |
| 2007/0226786 | A1 | 9/2007 | Berger et al. | |

(Continued)

OTHER PUBLICATIONS

Danev, Boris, et al., "Enabling Secure VM-vTPM Migration in Private Clouds", In Proceedings of the 27th Annual Computer Security Applications Conference (ACSAC), Dec. 5, 2011, pp. 187-196.

(Continued)

*Primary Examiner* — Trong H Nguyen
(74) *Attorney, Agent, or Firm* — Wade IP Law LLC

(57) ABSTRACT

Techniques are described herein that are capable of establishing system integrity using attestation for a virtual trusted platform module (vTPM). For instance, an endorsement key certificate, including an endorsement key associated with the vTPM, may be signed to issue the endorsement key certificate to the vTPM. The endorsement key certificate may be used to establish a chain of trust with regard to the vTPM. For instance, the endorsement key certificate may be used to attest the vTPM (and measurements provided by the vTPM).

20 Claims, 9 Drawing Sheets

(56) References Cited

U.S. PATENT DOCUMENTS

| | | | | |
|---|---|---|---|---|
| 2008/0244569 | A1* | 10/2008 | Challener | G06F 21/57 718/1 |
| 2010/0031047 | A1* | 2/2010 | Coker, II | H04L 63/0281 713/176 |
| 2013/0227281 | A1* | 8/2013 | Kounga | G06F 21/44 713/165 |
| 2014/0006776 | A1* | 1/2014 | Scott-Nash | G06F 21/57 713/156 |
| 2014/0007087 | A1* | 1/2014 | Scott-Nash | G06F 21/53 718/1 |
| 2014/0075522 | A1* | 3/2014 | Paris | G06F 21/44 726/5 |
| 2014/0258733 | A1 | 9/2014 | Scott-Nash | |
| 2016/0149912 | A1* | 5/2016 | Scott-Nash | H04L 63/0876 713/176 |

OTHER PUBLICATIONS

Liang, Xinlog, et al., "Secure arid Reliable VM-vTPM Migration in Private Cloud", in Proceedings of 2nd International Symposium on instrumentation and Measurement, Sensor Network and Automation(IMSNA), Dec. 23, 2013, pp. 510-514.

"International Search Report & Written Opinion Issued in PCT Application No. PCT/US2018/046389", dated Oct. 31, 2018, 12 Pages.

* cited by examiner

SYSTEM INTEGRITY USING ATTESTATION FOR VIRTUAL TRUSTED PLATFORM MODULE

BACKGROUND

A trusted platform module (TPM) is a microcontroller designed to assure integrity (e.g., expected behavior) of a device by integrating cryptographic keys and unforgeable measurements into the device. Such cryptographic keys may be used to establish a "chain of trust" under which each component of hardware and software of the device may be validated (a.k.a. certified). The process of validating the integrity of the device or any components thereof is referred to as "attestation."

TPMs typically are configured to operate in accordance with the TPM technical specification written by a computer industry consortium called Trusted Computing Group (TCG). A TPM often is implemented as a semiconductor chip that has a randomly-created, static endorsement key associated with the chip. The endorsement key has a public portion (a.k.a. public key) and a private portion (a.k.a. private key). The private portion does not leave the chip; whereas, the public portion is publicly available for attestation and other purposes.

A virtual trusted platform module (vTPM) is a software emulation of a TPM. The vTPM may be provided by a hypervisor, for example. A chain of trust typically is not capable of being established with regard to a vTPM because the vTPM is not rooted in hardware or firmware of a host on which the vTPM runs. Unlike with a hardware TPM, no entity vouches for the integrity of the vTPM in a conventional system. Accordingly, a vTPM typically does not come with an endorsement key certificate.

SUMMARY

Various approaches are described herein for, among other things, establishing system integrity using attestation for a virtual trusted platform module (vTPM). For instance, an endorsement key certificate, including an endorsement key associated with the vTPM, may be signed to issue the endorsement key certificate to the vTPM. The endorsement key certificate may be used to establish a chain of trust with regard to the vTPM. For instance, the endorsement key certificate may be used to attest the vTPM (and measurements provided by the vTPM)

In a first example approach, a virtual machine that is hosted by an isolated environment (e.g., a host operating system) that runs on a host provides a guest endorsement key certificate and guest measurements to a guest attestation service. The guest endorsement key certificate includes a guest endorsement key associated with a virtual trusted platform module that is hosted by the host operating system. The guest endorsement key certificate vouches for the guest endorsement key, thus providing a chain of trust from the guest endorsement key to the host on which the vTPM is hosted. The guest measurements indicate attributes of a guest operating system that runs on the virtual machine. The virtual machine receives a verification from the guest attestation service. The verification indicates that the guest measurements are trustworthy based at least in part on the guest endorsement key certificate being issued via a chain of trust that includes a host attestation service that is configured to attest the host.

In a second example approach, a guest attestation service that is configured to attest a virtual machine that is hosted by a host operating system that runs on a host receives a guest endorsement key certificate and guest measurements. The guest endorsement key certificate includes a guest endorsement key associated with the virtual trusted platform module that is hosted by the host operating system. The guest endorsement key certificate vouches for the guest measurements. The guest measurements indicate attributes of a guest operating system that runs on the virtual machine. The guest attestation service determines that the guest endorsement key certificate is issued via a chain of trust that includes a host attestation service that is configured to attest the host. The guest attestation service generates a verification indicating that the guest measurements are trustworthy based at least in part on a determination that the guest endorsement key certificate is issued via the chain of trust that includes the host attestation service. The guest attestation service provides the verification to the virtual machine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
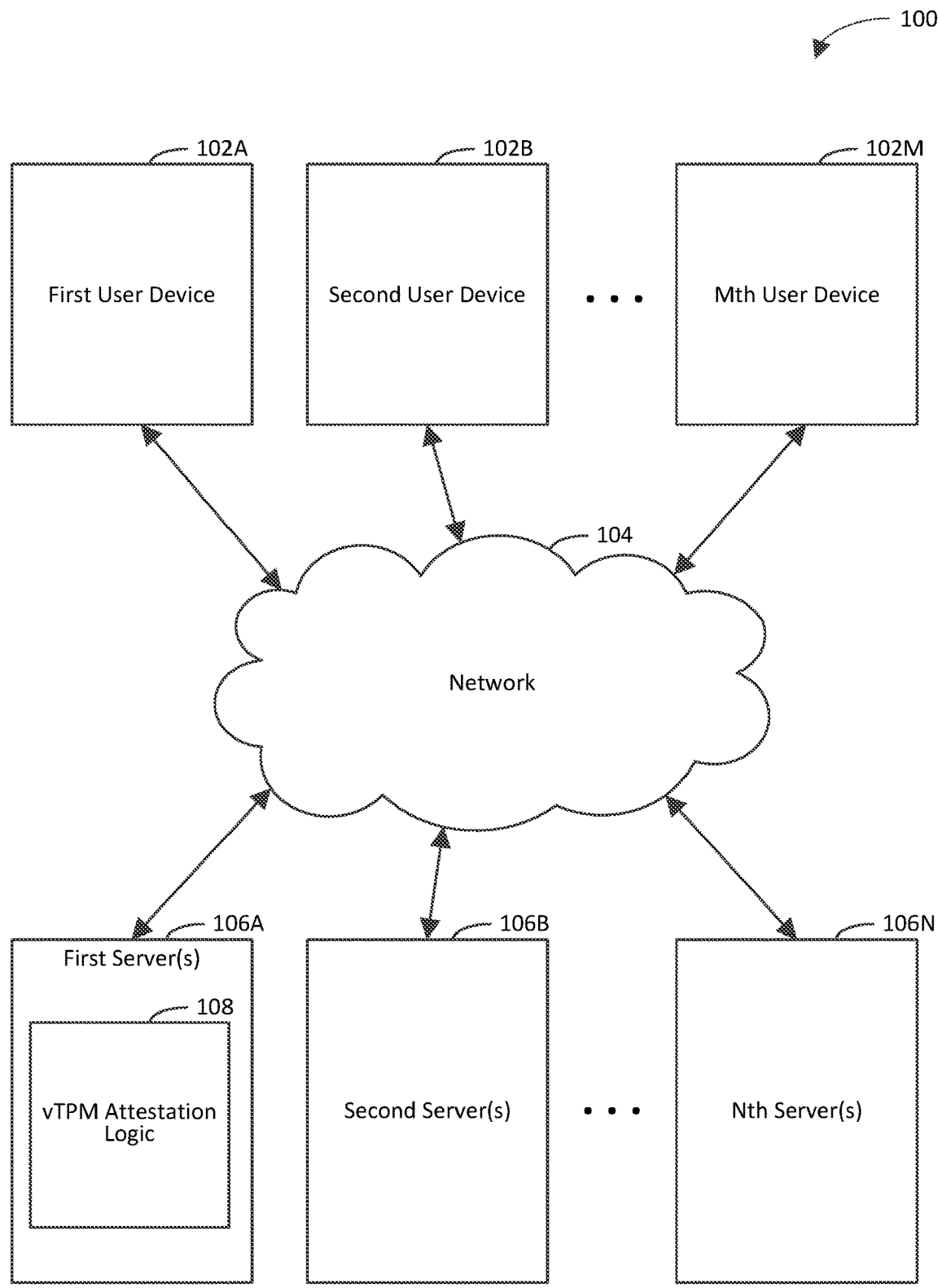
FIG. 1 is a block diagram of an example vTPM attestation system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required. Moreover, a first element may or may not be different from a second element. For instance, the first element may not include the second element and/or may not be included in the second element. A third element may or may not be different from each of the first element and the second element, and so on.

II. Example Embodiments

Example embodiments described herein are capable of establishing system integrity using attestation for a virtual trusted platform module (vTPM). For instance, an endorsement key certificate, including an endorsement key associated with the vTPM, may be signed to issue the endorsement key certificate to the vTPM. The endorsement key certificate may be used to establish a chain of trust with regard to the vTPM. For instance, the endorsement key certificate may be used to attest the vTPM (and measurements provided by the vTPM).

Example techniques described herein have a variety of benefits as compared to conventional attestation techniques. For instance, the example techniques may be capable of validating (e.g., establishing trust in) a vTPM (e.g., by issuing an endorsement key certificate to the vTPM). The ability to validate a vTPM may increase security of a system in which the vTPM runs. The example techniques may be capable of using a host signing key certificate certified by a host attestation service associated with the host to validate (e.g., automatically validate) guest measurements that are provided by the vTPM. For example, a guest attestation service may use the host signing key certificate to validate that the host has issued the endorsement key certificate. In accordance with this example, using the host signing key certificate may enable the guest attestation service to bind trust in the guest virtual machine corresponding to the vTPM with trust in the host. The example techniques may be capable of performing attestation backed by the vTPM in conformance with the TPM technical specification written by the TCG. The example techniques may support migration of the vTPM between hosts.

For example, the guest virtual machine may be migrated from a source host to a target host. The migration may occur while the guest virtual machine is running (e.g., without the guest virtual machine going down during the migration). Such a migration is referred to as a "live migration." In accordance with this example, migration of the guest virtual machine may cause the vTPM to migrate from the source host to the target host (e.g., while maintaining integrity of the system).

In another example, a guest operating system running on a source virtual machine that is hosted by a source host operating system of a source host may be shut down and restarted on a target virtual machine that is hosted by a target host operating system of a target host. In accordance with this example, shutting down the guest operating system on the source virtual machine and restating the guest operating system on the target virtual machine may cause the vTPM associated with the guest operating system to migrate from the source host to the target host (e.g., while maintaining integrity of the system).

When migration of a vTPM is performed as described in the examples above, the chain of trust associated with the vTPM may be maintained by re-issuing the endorsement key certificate on the target host. In fact, each host that receives the vTPM signs for the endorsement key certificate to re-issue the endorsement key certificate on that host. The vTPM may be migrated from host to host without each host that receives the vTPM having to communicate with another machine (e.g., a host attestation service) via a network in order for the endorsement key certificate to be re-issued on that host. The ability of each host to re-issue the endorsement key certificate through operations performed exclusively on the host may reduce network load of the system.

FIG. 1 is a block diagram of an example vTPM attestation system 100 in accordance with an embodiment. Generally speaking, vTPM attestation system 100 operates to provide information to users (e.g., software engineers, application developers, etc.) in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, vTPM attestation system 100 establishes system integrity using attestation for a vTPM. Detail regarding techniques for establishing system integrity using attestation for a vTPM is provided in the following discussion.

As shown in FIG. 1, vTPM attestation system 100 includes a plurality of user systems 102A-102M, a network 104, and a plurality of servers 106A-106N. Communication among user systems 102A-102M and servers 106A-106N is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 104A-104N, so that user systems 102A-102M may access information that is available via the domains. Such domain may include Web pages, which may be provided as hypertext markup language (HTML) documents and objects (e.g., files) that are linked therein, for example.

Each of user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more user systems 102A-102M may communicate with any one or more servers 106A-106N.

Servers 106A-106N are processing systems that are capable of communicating with user systems 102A-102M. Servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, servers 106A-106N are configured to host respective Web sites, so that the Web sites are accessible to users of vTPM attestation system 100.

First server(s) 106A is shown to include vTPM attestation logic 108 for illustrative purposes. vTPM attestation logic 108 is configured to establish system integrity using attestation for a vTPM. More generally, vTPM attestation logic 108 may utilize trusted computing, which is a technology developed and promoted by Trusted Computing Group (TCG), to ensure that one or more of user devices 102A-102M and/or one or more of servers 106A-106N behaved in expected ways. For instance, vTPM attestation logic 108 may utilize endorsement key(s), secure input and output, memory curtaining/protected execution, sealed storage, remote attestation, and/or trusted third party (TTP) to assure integrity of one or more of user devices 102A-102M and/or one or more of servers 106A-106N.

vTPM attestation logic 108 may cause a host operating system that runs on a host to sign a guest endorsement key certificate to issue the guest endorsement key certificate to a vTPM. The guest endorsement key certificate includes a guest endorsement key associated with the vTPM, which is hosted by the host operating system. vTPM attestation logic 108 may cause a virtual machine that is hosted by the host operating system to use the guest endorsement key certificate to vouch for guest measurements that indicate attributes of a guest operating system that runs on the virtual machine.

vTPM attestation logic 108 may be implemented in various ways to establish system integrity using attestation for a vTPM, including being implemented in hardware, software, firmware, or any combination thereof. For example, vTPM attestation logic 108 may be implemented as computer program code configured to be executed in one or more processors. In another example, at least a portion of vTPM attestation logic 108 may be implemented as hardware logic/electrical circuitry. For instance, at least a portion of vTPM attestation logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

vTPM attestation logic 108 is shown to be incorporated in first server(s) 106A for illustrative purposes and is not intended to be limiting. It will be recognized that vTPM attestation logic 108 (or any portion(s) thereof) may be incorporated in any one or more of the user systems 102A-102M. For example, client-side aspects of vTPM attestation logic 108 may be incorporated in one or more of the user systems 102A-102M, and server-side aspects of vTPM attestation logic 108 may be incorporated in first server(s) 106A. In another example, vTPM attestation logic 108 may be distributed among the user systems 102A-102M. In yet another example, vTPM attestation logic 108 may be incorporated in a single one of the user systems 102A-102M. In another example, vTPM attestation logic 108 may be distributed among the server(s) 106A-106N. In still another example, vTPM attestation logic 108 may be incorporated in a single one of the server(s) 106A-106N.

Figure 2:
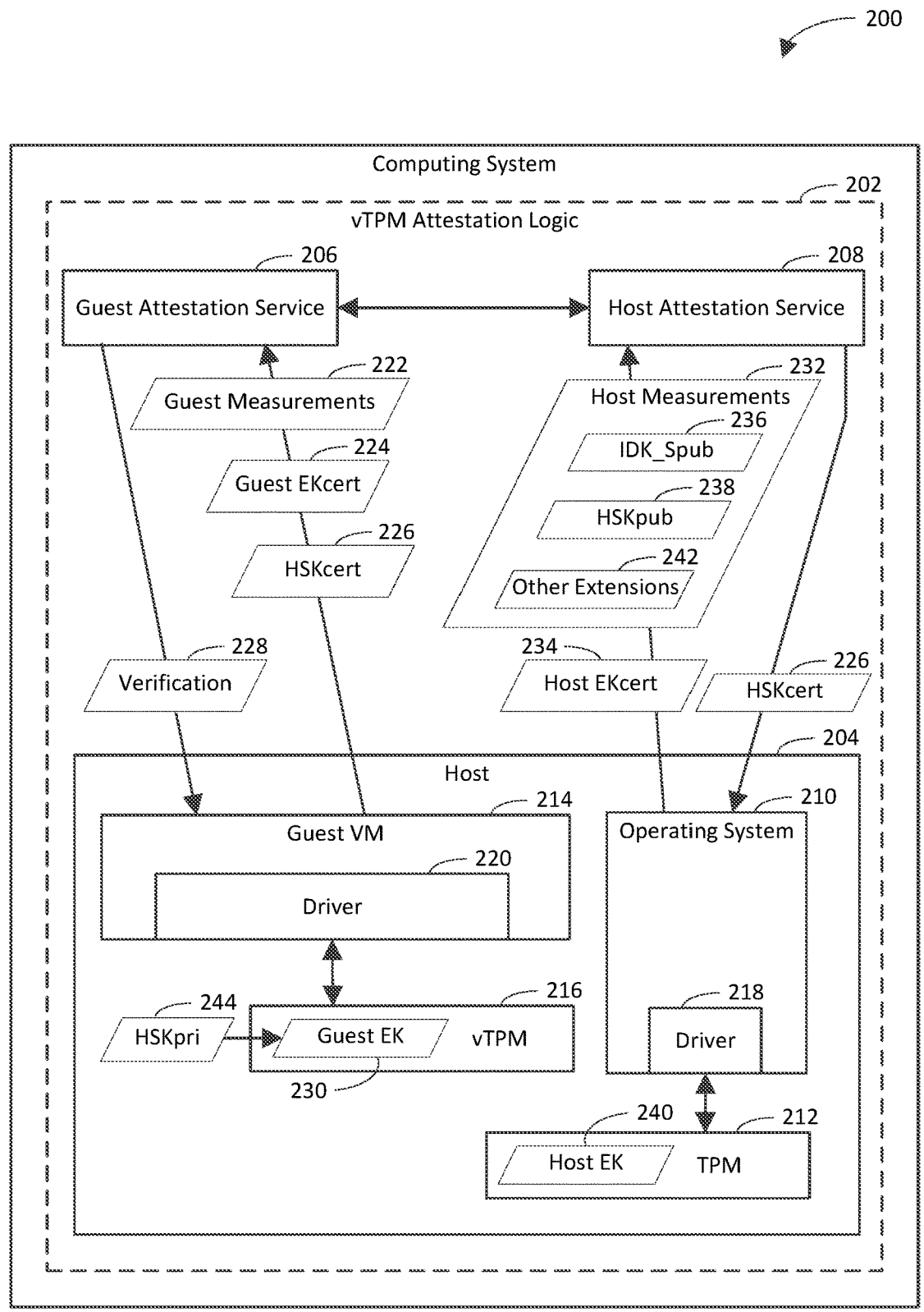
FIGS. 2-3 are block diagrams of example computing systems in accordance with embodiments.

FIG. 2 is a block diagram of an example computing system 200 in accordance with an embodiment. Computing system 200 may include one or more of user systems 102A-102M, one or more of server(s) 106A-106N, or any combination thereof, though the scope of the example embodiments is not limited in this respect. Computing system 200 includes vTPM attestation logic 202, which is an example implementation of vTPM attestation logic 108 shown in FIG. 1. vTPM attestation logic 202 includes a host 204, a guest attestation service 206, and a host attestation service 208.

Host 204 includes an operating system 210 (e.g., bare metal operating system), a TPM 212, a guest virtual machine 214, and a vTPM 216. TPM 212 is a physical hardware component that assures integrity of host 204. TPM 212 includes a host endorsement key 240. Host endorsement key 240 may help vouch for a state (or portion thereof) of operating system 210. Host endorsement key 240 is an asymmetric key. Host endorsement key 240 may include a private portion and a public portion. The private portion remains private within TPM 212 (i.e., is not shared outside TPM 212). The public portion is shared outside TPM 212 for purposes of establishing a chain of trust with regard to hardware and software components of host 204. It should be noted that the host endorsement key 240 is included in a host endorsement key certificate 234 that is issued to TPM 212 by a manufacturer of TPM 212. TPM 212 receives host measurements 232 from operating system 210, and the host measurements 232 are reflected in platform configuration registers (PCRs) through a set of "extend" (e.g., cryptographic hash) operations. The host measurements 232 include security relevant metrics pertaining to host 204. Such metrics may include information about a pre-boot environment of host 204, information about operating system 210, etc. It will be recognized by persons skilled in the relevant art(s) that the host measurements 232 may be used to detect changes in a configuration of hardware and software components of host 204.

Operating system 210 performs operations which may include but are not limited to managing computer hardware and software resources and providing services for computer programs on host 204. Operating system 210 monitors host 204 and gathers the host measurements 232. For instance, operating system 210 may begin gathering the host measurements 232 from the time at which host 204 boots up. Examples of an operating system include but are not limited to Berkeley Software Distribution™ (BSD), developed and distributed by the Computer Systems Research Group (CSRG) of the University of California, Berkeley, or descendants thereof; Linux developed and distributed under the GNU Project; iOS™ developed and distributed by Apple Inc., Microsoft Windows® developed and distributed by Microsoft Corporation; and UNIX™ developed and distributed by AT&T.

Operating system 210 includes a driver 218, which is configured to query TPM 212 to obtain the host endorsement key certificate 234, which includes the host endorsement key 240. Driver 218 is also configured to query TPM 212 to obtain the host measurements 232 that are reflected in the platform configuration registers of TPM 212.

vTPM 216 is an emulation of a TPM that assures integrity of guest virtual machine 214. vTPM 216 includes a guest endorsement key 230. For instance, the guest endorsement key 230 may uniquely identify vTPM 216. Guest endorsement key 230 may vouch for a state (or portion thereof) of an operating system that runs on guest virtual machine 214. Guest endorsement key 230 is an asymmetric key. Guest endorsement key 230 includes a private portion and a public portion. The private portion remains private within vTPM 216 (i.e., is not shared outside vTPM 216). The public portion is shared outside vTPM 216 for purposes of establishing a chain of trust with regard to virtual hardware components and software components of guest virtual machine 214. In some example embodiments, an entity that is trusted by guest attestation service 206 or an intermediate certificate authority (CA) uses a private portion of a host signing key (HSKpri) 244 that is associated with host 204 to sign the guest endorsement key 230, resulting in issuance of a guest endorsement key certificate 224 that includes the guest endorsement key 230. The intermediate CA may run in operating system 210 or in a separate virtual machine or another isolated environment, such as an ARM TrustZone®, Intel Software Guard Extensions (SGX™), AMD Secure Encrypted Virtualization (SEV™), etc. In one example, operating system 210 may use the HSKpri 244 to sign the guest endorsement key 230. It should be noted that the host signing certificate also may be referred to as an "intermediate certificate authority (CA) certificate." In other example embodiments, host attestation service 208 signs the guest endorsement key 230. For instance, host attestation service 208 may issue the guest endorsement key 230 directly without delegating the task to operating system 210 or another entity.

vTPM 216 receives guest measurements 222 from guest virtual machine 214 (e.g., from a guest operating system running on guest virtual machine 214). The guest measurements 222 include security relevant metrics pertaining to guest virtual machine 214. Such metrics may include information about a pre-boot environment of guest virtual machine 214, information about the guest operating system that runs on guest virtual machine 214, etc. It will be recognized by persons skilled in the relevant art(s) that the guest measurements 222 may be used to detect changes in a configuration of virtual hardware components and software components of guest virtual machine 214.

Guest virtual machine 214 is an emulation of a computer system. Accordingly, virtual machine 214 provides functionality of a physical computer. Guest virtual machine 214 (e.g., the guest operating system that runs on guest virtual machine 214) gathers the guest measurements 222. Guest virtual machine 214 includes a driver 220, which is configured to query vTPM 216 to obtain the guest endorsement key certificate 224, which includes the guest endorsement key 230. Driver 220 is also configured to query vTPM 216 to obtain the guest measurements 222.

Guest virtual machine 214 and/or vTPM 216 may run side-by-side with operating system 210 on top of a hypervisor, though the scope of the example embodiments is not limited in this respect. Guest virtual machine 214 and/or vTPM 216 may run in an isolated environment on host 204.

Host attestation service 208 is configured to attest the host 204. Host attestation service 208 performs interactions regarding attestation with operating system 210. Host attestation service 208 receives the host measurements 232 and the host endorsement key certificate 234 from operating system 210. The chain of trust from the TPM 212 to the host measurements 232 is established because the manufacturer of TPM 212 signs for the host endorsement key certificate 234, and the host endorsement key certificate 234 vouches for the host measurements 232. In a first certificate issuance example, host attestation service 208 may use this chain of trust to certify a host signing key certificate 226 that corresponds to the HSKpri 244, and an entity such as operating system 210 may use the HSKpri 244 to sign the guest endorsement key certificate 224. In a second certificate issuance example, host attestation service 208 may issue the guest endorsement key certificate 224 directly without delegating the task to operating system 210 or another entity.

In accordance with the first certificate issuance example, the host measurements 232 may include a public portion of an identity key (IDK_Spub) 236, a public portion of the host signing key (HSKpub) 238, and other extensions 242. The IDK_Spub 236 is a signing key (e.g., in a TCG log) that may be used to determine an identity of an entity. The IDK_Spub 236 is generated based on the HSKpub 238 and properties of a certificate authority (CA). The IDK_Spub 236 corresponds to (e.g., forms a key pair with) a private portion of the identity key (IDK_Spri). The IDK_Spri may be generated by operating system 210 at boot time or other suitable time. The IDK_Spri is used to sign a report that includes the HSKpub 238. For instance, the report may include the host measurements 232 and the host endorsement key certificate 234. The HSKpub 238 corresponds to (e.g., forms a key pair with) the HSKpri 244, which is used to sign the guest endorsement key certificate 224 in this example. Host attestation service 208 is capable of verifying signatures made by a private key if it has (and has trust in) the corresponding public key. Accordingly, host attestation service 208 is capable of verifying signatures made by the IDK_Spri based on host attestation service 208 having (and having trust in) the IDK_Spub 236. Host attestation service 208 has ways of establishing trust in the IDK_Spub 236 that are known to persons skilled in the relevant art. The other extensions 242 are mentioned merely to indicate that the host measurement 232 may include information in addition to the IDK_Spub 236 and the HSKpub 238. Host attestation service 208 certifies the host signing key certificate 226 around the HSKpub 238 based on (e.g., based at least in part on) a determination that the host endorsement key certificate 234 vouches for the host measurements 232, which include the HSKpub 238. For instance, host attestation service 208 may certify the host signing key certificate 226 without knowledge of the HSKpri 244 because host attestation service 208 has established trust in the HSKpub 238.

The IDK_Spub 236, the HSKpub 238, and/or the other extensions 242 may be held in virtual secure mode (VSM), though the example embodiments are not limited in this respect. Virtual secure mode is an isolation mechanism that enables processes to be run in a trusted execution environment. A trusted execution environment is a secure area of the main processor in a computing system (e.g., computing system 200). If virtual secure mode is utilized, the HSKpub 238 may run in a user mode, and IDK_Spub 236 may run in kernel mode. It should be noted that the example techniques described herein need not necessarily use virtual secure mode for attestation or any other purpose, though use of virtual secure mode for attestation provides greater security to the computing system 200. Accordingly, the example techniques described herein need not necessarily use the IDK_Spri and the IDK_Spub 236 for attestation or any other purpose.

Guest attestation service 206 is configured to attest the guest virtual machine 214. Guest attestation service 206 performs interactions regarding attestation with guest virtual machine 214 (e.g., with the guest operating system that runs on guest virtual machine 214). Guest attestation service 206 receives the guest measurements 222 and the guest endorsement key certificate 224 (and in some embodiments, the host signing key certificate 226) from guest virtual machine 214 (e.g., the guest operating system running on guest virtual machine 214). As described above, host attestation service 208 signs for the host signing key certificate 226 so that another entity may sign the guest endorsement key certificate 224 (in accordance with the first certificate issuance example), or host attestation service 208 may issue the guest endorsement key certificate 224 directly (in accordance with the second certificate issuance example). Guest attestation service 206 trusts host attestation service 208. By reviewing the guest measurements 222 and the guest endorsement key certificate 224 (and in some embodiments, the host signing key certificate 226), guest attestation service 206 determines that the HSKpri 244 (corresponding to HSKcert 226, which is issued by host attestation service 208, which guest attestation service 206 trusts) signs for the guest endorsement key certificate 224 (in accordance with the first certificate issuance example) or that host attestation service 208 issues the guest endorsement key certificate 224 directly (in accordance with the first certificate issuance example), and the guest endorsement key certificate 224 vouches for the guest measurements 222. Accordingly, the chain of trust extends from the TPM 212 to the vTPM 216 to the guest measurements 222. Upon making the determination that the chain of trust extends to the guest measurements, guest attestation service 206 provides a verification 228, which indicates that the guest measurements 222 are validated.

Although validation of the guest measurements 222 need not necessarily involve the host signing key (e.g., HSKpub 238 and HSKpri 244), using the host signing key may reduce network load associated with communications between the guest attestation service 206 and the host attestation service 208. For example, by having the host signing key available to the operating system 210 or other entity on the computing system 200, any number of virtual machines may be launched on the computing device 200, and all of the corresponding vTPMs may be certified using this single host signing key; it is not necessary to visit the host attestation service 208 again each time a vTPM is to be certified.

It will be recognized that any of the public keys described herein (e.g., HSKpub 238, IDK_Spub 236) may be certified in accordance with the X.509 standard. The X.509 standard defines the format of public key certificates. In accordance with the X.509 standard, when a certificate is signed by a certificate authority (or otherwise validated), the holder of the certificate can rely on the public key that is included in the certificate to establish secure communications with another party and validate information (e.g., documents) digitally signed by the corresponding private key.

It will be further recognized that computing system 200 may not include one or more of the components shown therein. For instance, computing system 200 need not necessarily include guest attestation service 206 and/or host attestation service 208. Furthermore, computing system 200 may include components in addition to or in lieu of the components shown therein. For instance, computing system 200 may include components in addition to or in lieu of host 204, guest attestation service 206, host attestation service 208, operating system 210, TPM 212, guest virtual machine 214, vTPM 216, driver 218, and/or driver 220.

Figure 3:
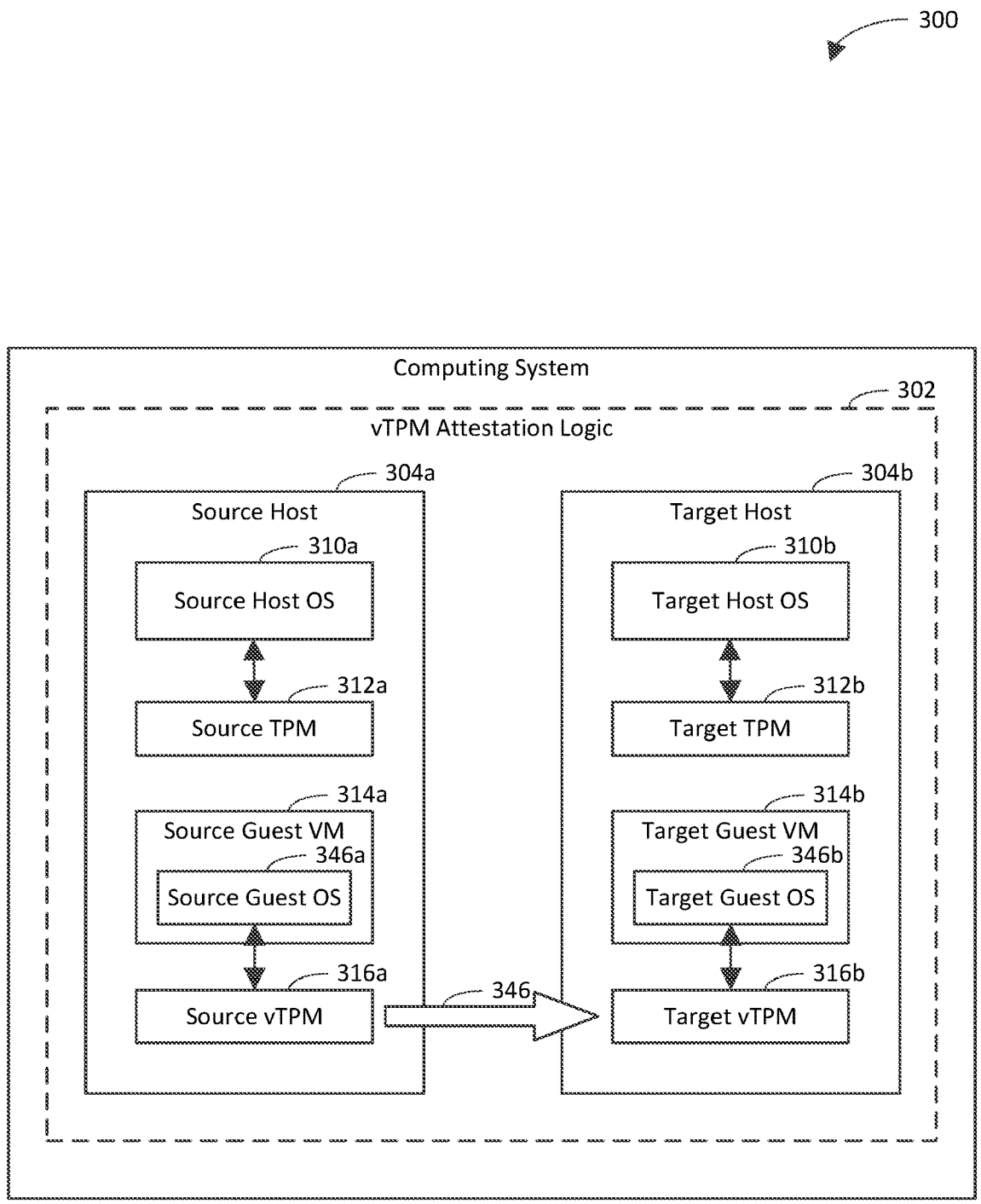

FIG. 3 is a block diagram of another example computing system 300 in accordance with an embodiment. Computing system 300 may include one or more of user systems 102A-102M, one or more of server(s) 106A-106N, or any combination thereof, though the scope of the example embodiments is not limited in this respect. Computing system 300 includes vTPM attestation logic 302, which is an example implementation of vTPM attestation logic 108 shown in FIG. 1. vTPM attestation logic 302 includes a source host 304a and a target host 304b. Source host 304a may be a first example implementation of host 204 shown in FIG. 2, and target host 304b may be a second example implementation of host 204. Each of the source host 304a and the target host 304b may be any suitable type of host, including but not limited to a cloud platform, a datacenter, a blade in a rack, a desktop computer, a laptop computer, a tablet computer, a wearable computer such as a smart watch or a head-mounted computer, a personal digital assistant, a cellular telephone, or an Internet of things (IoT) device.

Source host 304a includes a source host operating system 310a, a source TPM 312a, a source guest virtual machine 314a, and a source vTPM 316a. Source guest virtual machine 314a includes a source guest operating system 346a. Target host 304b includes a target host operating system 310b, a target TPM 312b, a target guest virtual machine 314b, and a target vTPM 316b. Target guest virtual machine 314b includes a target guest operating system 346b.

Arrow 346 indicates that source vTPM 316a may be migrated from source host 304a to target host 304b (e.g., while maintaining integrity of computing system 300). Source vTPM 316a and target vTPM 316b may be implemented as respective processes running in respective isolated environments of the respective hosts 304a and 304b (e.g., on respective host operating systems 310a and 310b). Migrating source vTPM 316a from source host 304a to target host 304b may include leaving the process of vTPM 316a running on source host operating system 310a and transferring the state of the process to target host 304b. An entity on target host 304b or associated with target host 304b may issue a target guest endorsement key certificate that includes the source guest endorsement key to target vTPM 316b. For instance, the target guest endorsement key certificate may be signed using a target host signing key certificate associated with target host 304b.

In one example, source guest virtual machine 314a is migrated from source host operating system 310a to target host operating system 310b. In accordance with this example, source vTPM 316a may automatically follow source guest virtual machine 314a to target host 304b by migrating from source host 304a to target host 304b. A more detailed discussion of an embodiment in which a virtual machine is migrated from a source host to a target host is provided below with reference to FIG. 7.

In another example, source guest operating system 346a is shut down on source guest virtual machine 314a and restarted on target guest virtual machine 314b. In accordance with this example, source vTPM 316a may automatically follow source guest operating system 346a to target host 304b by migrating from source host 304a to target host 304b. A more detailed discussion of an embodiment in which a guest operating system is shut down on a source guest virtual machine of a source host and restarted on a target guest virtual machine of a target host is provided below with reference to FIG. 8.

It should be noted that if target guest virtual machine 314*b* uses cached copies of the guest endorsement key certificate (and in some embodiments, the HSKcert) from source host 304*a* to perform attestation against the guest attestation service, the guest attestation service will make its validity decision based on stale information. For instance, the cached copies pertain to source host 304*a*, rather than target host 304*b*. In a worst-case scenario, an attestation attempt from target host 304*b* using the information cached on source host 304*a* may succeed; whereas, an attestation attempt using current information obtained on target host 304*b* would have failed. This issue may be addressed using several techniques.

In a first example technique, nothing is done to address the issue. This technique may be sufficient because the migration protocols may ensure that target host 304*b* is no less secure (e.g., satisfies the same fabric host attested security properties) as source host 304*a*. One advantage of this technique is simplicity. One potential disadvantage is that, if the assumption of equivalent security is ever relaxed, the aforementioned problems may appear. Application writers may be advised to not attempt attestation using cached certificates and to use "fresh" (i.e., recently fetched) certificates instead. While live migration may still occur even while the virtual machine is attempting attestation, using the freshest certificates reduces the potential window of vulnerability.

In a second example technique, the guest endorsement key certificate is revoked at the time of migration. Note that it may not be desirable to revoke the HSKcert because the HSKcert may vouch for vTPMs of multiple virtual machines. Accordingly, revoking the HSKcert may be relatively cumbersome.

In a third example technique, a cryptographic binding of the attestation attempt to the HSKcert may be provided. For instance, the guest certificate authority (CA) may issue a cryptographic challenge (e.g., a "nonce"), which the CA expects to be signed using the HSKcert and returned. This may mitigate the original vulnerability because target guest virtual machine 314*b* in target host 304*b* no longer has access to the private signing key (i.e., HSKpri) corresponding to the HSKcert associated with source host 304*a*. Accordingly, target guest virtual machine 314*b* would be unable to perform attestation using the cached certificates. Note that although this technique works with a host signing key certificate key, the technique may not work with a guest endorsement key because 1) the endorsement key is a decryption key and therefore may not be suitable for signing, and 2) the endorsement key does not change when the virtual machine migrates (whereas, the host signing key certificate key changes because it is different on every host).

FIGS. 4-8 depict flowcharts 400, 500, 600, 700, and 800 of example methods for attesting a vTPM in accordance with embodiments. Flowcharts 400, 500, 600, 700, and 800 may be performed by vTPM attestation logic 108 shown in FIG. 1, for example. For illustrative purposes, flowcharts 400, 500, and 600 are described with respect to computing system 200 shown in FIG. 2, and flowcharts 700 and 800 are described with respect to computing system 300 shown in FIG. 3. Further structural and operational embodiments will be apparent to persons skilled in the relevant art(s) based on the discussion regarding flowcharts 400, 500, 600, 700, and 800.

Figure 4:
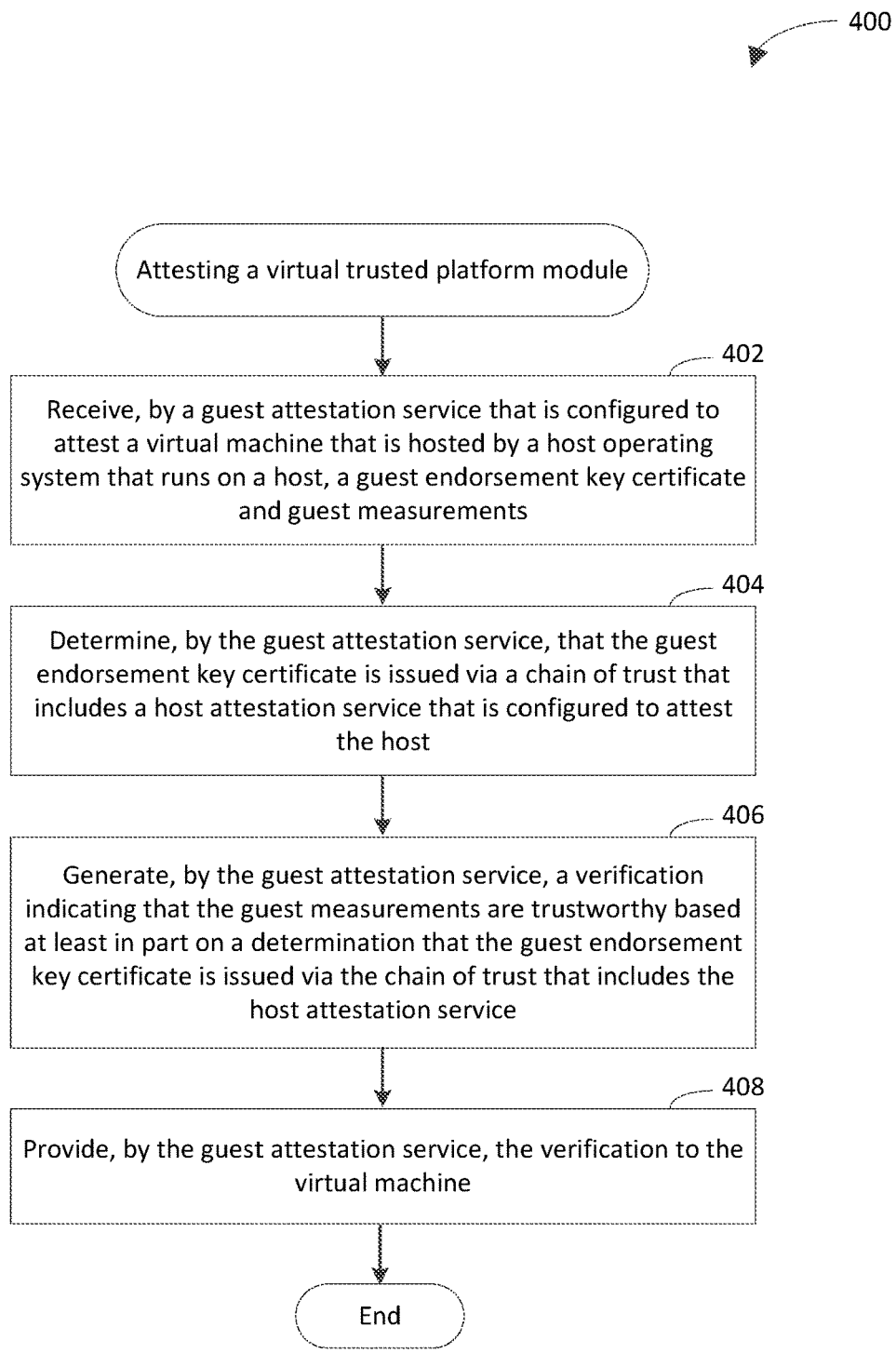
FIGS. 4-8 depict flowcharts of example methods for attesting a vTPM in accordance with embodiments.

As shown in FIG. 4, the method of flowchart 400 begins at step 402. In step 402, a guest endorsement key certificate and guest measurements are received by a guest attestation service that is configured to attest a virtual machine that is hosted by an isolated environment (e.g., a host operating system, another guest virtual machine, or a trusted execution environment such as ATM TrustZone®) that runs on a host. The guest endorsement key certificate includes a guest endorsement key associated with the virtual trusted platform module that is hosted by the isolated environment that runs on the host. The guest endorsement key certificate vouches for the guest measurements. The guest measurements indicate attributes of a guest operating system that runs on the virtual machine. In an example implementation, guest attestation service 206 receives the guest endorsement key certificate 224 and the guest measurements 222. Guest attestation service 206 is configured to attest guest virtual machine 214, which is hosted by operating system 210 that runs on host 204. The guest endorsement key certificate 224 includes the guest endorsement key 230 associated with vTPM 216, which is hosted by operating system 210. The guest endorsement key certificate 224 vouches for the guest measurements 222. The guest measurements 222 indicate attributes of a guest operating system that runs on guest virtual machine 214.

At step 404, a determination is made, by the guest attestation service, that the guest endorsement key certificate is issued via a chain of trust that includes a host attestation service that is configured to attest the host. For example, the determination may be made based at least in part on the endorsement key being signed by the host attestation service to issue the guest endorsement key certificate to the virtual trusted platform module. In another example, the determination may be made based at least in part on the endorsement key certificate being signed (e.g., by an entity other than the host attestation service) using a host signing key whose host signing key certificate is certified by the host attestation service. In an example implementation, guest attestation service 206 determines that the guest endorsement key certificate 224 is issued via a chain of trust that includes host attestation service 208, which is configured to attest host 204.

At step 406, a verification is generated by the guest attestation service based at least in part on a determination that the guest endorsement key certificate is issued via the chain of trust that includes the host attestation service. The verification indicates that the guest measurements are trustworthy. In an example implementation, guest attestation service 206 generates the verification 228 based at least in part on a determination that the guest endorsement key certificate 224 is issued via the chain of trust that includes host attestation service 208. The verification 228 indicates that the guest measurements 222 are trustworthy.

At step 408, the verification is provided by the guest attestation service to the virtual machine. In an example implementation, guest attestation service 206 provides the verification 228 to guest virtual machine 214.

In an example embodiment, receiving the guest endorsement key certificate and the guest measurements at step 402 includes receiving the guest endorsement key certificate, the guest measurements, and a host signing key certificate by the guest attestation service from the virtual machine. The host signing key certificate is certified by a host attestation service that is configured to attest the host. The host signing key certificate includes a public portion of a host signing key that corresponds to a private portion of the host signing key that is used to sign the guest endorsement key certificate. In accordance with this embodiment, determining that the guest endorsement key certificate is issued via the chain of trust that includes the host attestation service at step 404 includes verifying that the host signing key was used to issue the guest endorsement key certificate.

In an example implementation of this embodiment, guest attestation service 206 receives the guest endorsement key certificate 224, the guest measurements 222, and the host signing key certificate 226 from guest virtual machine 214. The host signing key certificate 226 is certified by host attestation service 208, which is configured to attest host 204. The host signing key certificate 226 includes the public portion of the host signing key (i.e., HSKpub) 238 that corresponds to the private portion of the host signing key (i.e., HSKpri) 244, which is used to sign the guest endorsement key certificate 224. In accordance with this embodiment, guest attestation service 206 verifies that the host signing key was used to issue the guest endorsement key certificate 224.

In some example embodiments, one or more steps 402, 404, 406, and/or 408 of flowchart 400 may not be performed. Moreover, steps in addition to or in lieu of steps 402, 404, 406, and/or 408 may be performed. For instance, in an example embodiment, the method of flowchart 400 further includes receiving, by the guest attestation service, a host signing key certificate from a host attestation service that certifies the host signing key rather than from the virtual machine. The host attestation service is configured to attest the host. For example, guest attestation service 206 may receive the HSKcert 226 from host attestation service 208, which certifies the host signing key, rather than from guest virtual machine 214. In accordance with this example, host attestation service 208 is configured to attest host 204. In accordance with this embodiment, the host signing key certificate includes a public portion of a host signing key that corresponds to a private portion of the host signing key that is used to sign the guest endorsement key certificate. For instance, the HSKcert 226 may include the public portion of the host signing key (i.e., HSKpub) 238 that corresponds to the private portion of the host signing key (i.e., HSKpri) 244, which is used to sign the guest endorsement key certificate 224. In further accordance with this embodiment, determining that the guest endorsement key certificate is issued via the chain of trust that includes the host attestation service at step 404 includes verifying that the host signing key was used to issue the guest endorsement key certificate. For instance, guest attestation service 206 may verify that the host signing key was used to issue the guest endorsement key certificate 224.

In another example embodiment, the method of flowchart 400 further includes providing, by the host operating system, a host endorsement key certificate and host measurements to a host attestation service. The host endorsement key certificate vouches for the host measurements. The host measurements indicate attributes of the host operating system. In an example implementation, operating system 210 provides the host endorsement key certificate 234 and the host measurements 232 to host attestation service 208. The host endorsement key certificate 234 vouches for the host measurements 232. The host measurements 232 indicate attributes of operating system 210. In accordance with this embodiment, the method of flowchart 400 further includes receiving, by the host operating system, a host signing key certificate from the host attestation service based at least in part on the host endorsement key certificate and the host measurements being provided to the host attestation service. The host signing key certificate includes a public portion of a host signing key that corresponds to a private portion of the host signing key that is used to sign the guest endorsement key certificate. In an example implementation, operating system 210 receives the host signing key certificate 226 from host attestation service 208 based at least in part on the host endorsement key certificate 234 and the host measurements 232 being provided to host attestation service 208. The host signing key certificate 2226 includes the public portion of the host signing key (i.e., HSKpub) 238 that corresponds to the private portion of the host signing key (i.e., HSKpri) 244, which is used to sign the guest endorsement key certificate 224.

In an aspect of this embodiment, receiving the guest endorsement key certificate and the guest measurements at step 404 includes receiving the guest endorsement key certificate, the guest measurements, and the host signing key certificate by the guest attestation service from the virtual machine. For instance, guest attestation service 206 may receive the guest endorsement key certificate 224, the guest measurements 222, and the host signing key certificate 226 from guest virtual machine 214. In accordance with this aspect, providing the verification at step 408 is based at least in part on the guest endorsement key certificate, the guest measurements, and the host signing key certificate being received by the guest attestation service from the virtual machine. For instance, guest attestation service 206 may provide the verification 228 based at least in part on the guest endorsement key certificate 224, the guest measurements 222, and the HSKcert 226 being received by guest attestation service 206 from guest virtual machine 214.

In yet another example embodiment, the method of flowchart 400 further includes providing, by the virtual machine hosted by the host operating system, the guest endorsement key to the host attestation service. For instance, guest virtual machine 214 may provide the guest endorsement key 230 to host attestation service 208. Guest virtual machine 214 is hosted by operating system 210. In accordance with this embodiment, the method of flowchart 400 further includes receiving, by the virtual machine, the guest endorsement key certificate from the host attestation service. For instance, guest virtual machine 214 receives the guest endorsement key certificate 224 from host attestation service 208.

Figure 5:
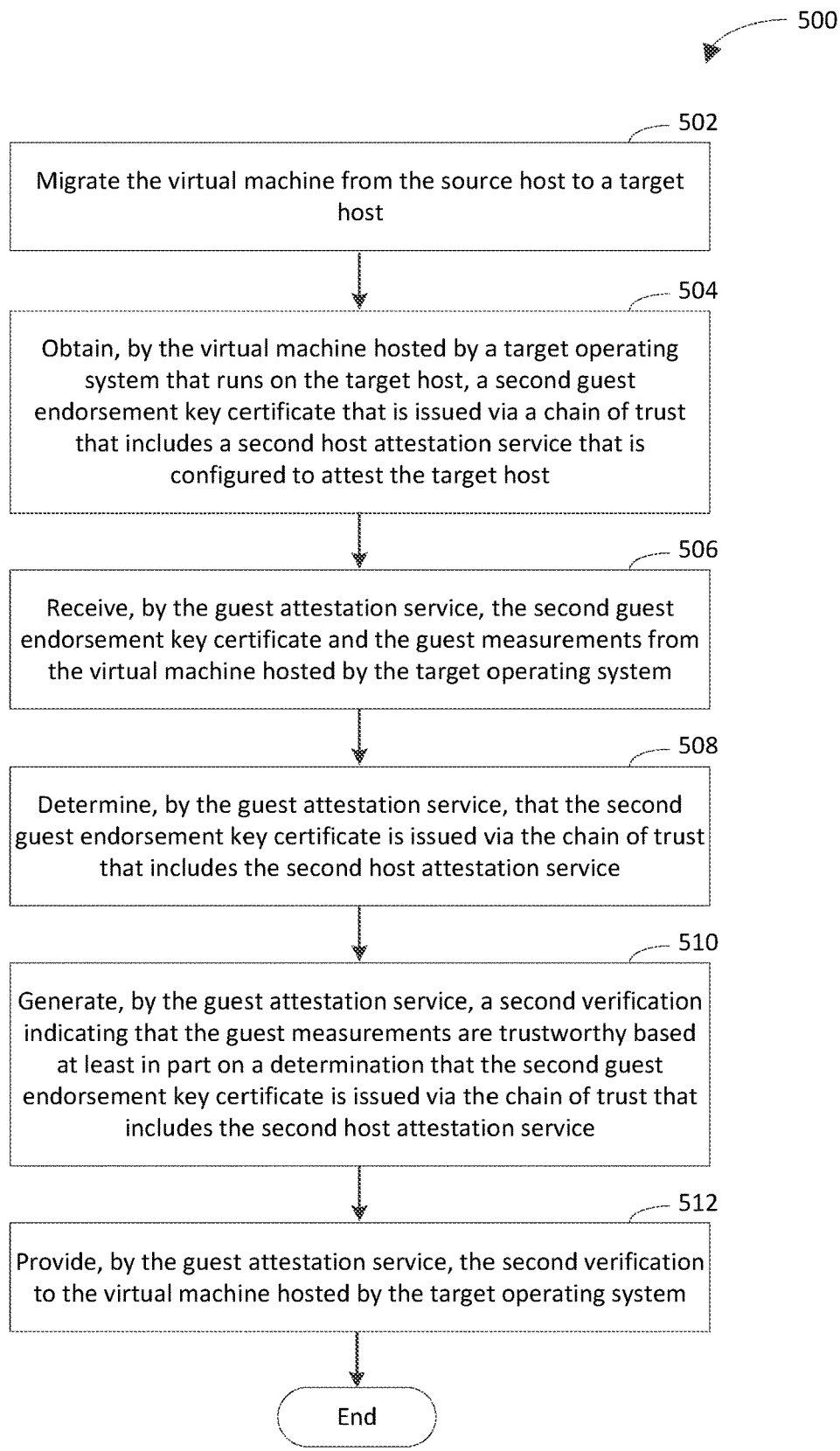

In still another embodiment, the method of flowchart 400 further includes one or more of the steps shown in flowchart 500 of FIG. 5. In the embodiment of FIG. 5, the host is a source host from which the virtual machine is to be migrated. For instance, host 204 may be the source host. As shown in FIG. 5, the method of flowchart 500 begins at step 502. In step 502, the virtual machine is migrated from the source host to a target host. In an example implementation, operating system 210 and/or a target host operating system on the target host migrates guest virtual machine 214 from host 204 to the target host.

At step 504, a second guest endorsement key certificate is obtained by the virtual machine hosted by a target operating system that runs on the target host. The second guest endorsement key certificate is issued via a chain of trust that includes a second host attestation service that is configured to attest the target host. The second guest endorsement key certificate includes the guest endorsement key. The second guest endorsement key certificate vouches for the guest measurements. The second host attestation service and the host attestation service that is configured to attest the source host may be the same or different. In an example implementation, guest virtual machine 214 is hosted by the target operating system, and guest virtual machine 214 obtains the second guest endorsement key certificate. In accordance with this implementation, the second guest endorsement key certificate includes the guest endorsement key 230. In further accordance with this implementation, the second guest endorsement key certificate vouches for the guest measurements 222.

At step 506, the second guest endorsement key certificate and the guest measurements are received by the guest attestation service from the virtual machine hosted by the target operating system. In an example implementation, guest attestation service 206 receives the second guest endorsement key certificate and the guest measurements 222 from guest virtual machine 214 hosted by the target operating system.

At step 508, a determination is made, by the guest attestation service, that the second guest endorsement key certificate is issued via the chain of trust that includes the second host attestation service. In an example implementation, guest attestation service 206 determines that the second guest endorsement key certificate is issued via the chain of trust that includes the second host attestation service.

At step 510, a second verification is generated by the guest attestation service based at least in part on a determination that the second guest endorsement key certificate is issued via the chain of trust that includes the second host attestation service. The second verification indicates that the guest measurements are trustworthy. In an example implementation, guest attestation service 206 generates the second verification, which indicates that the guest measurements 222 are trustworthy.

At step 512, the second verification is provided by the guest attestation service to the virtual machine hosted by the target operating system. In an example implementation, guest attestation service 206 provides the second verification to guest virtual machine 214 hosted by the target operating system.

Figure 6:
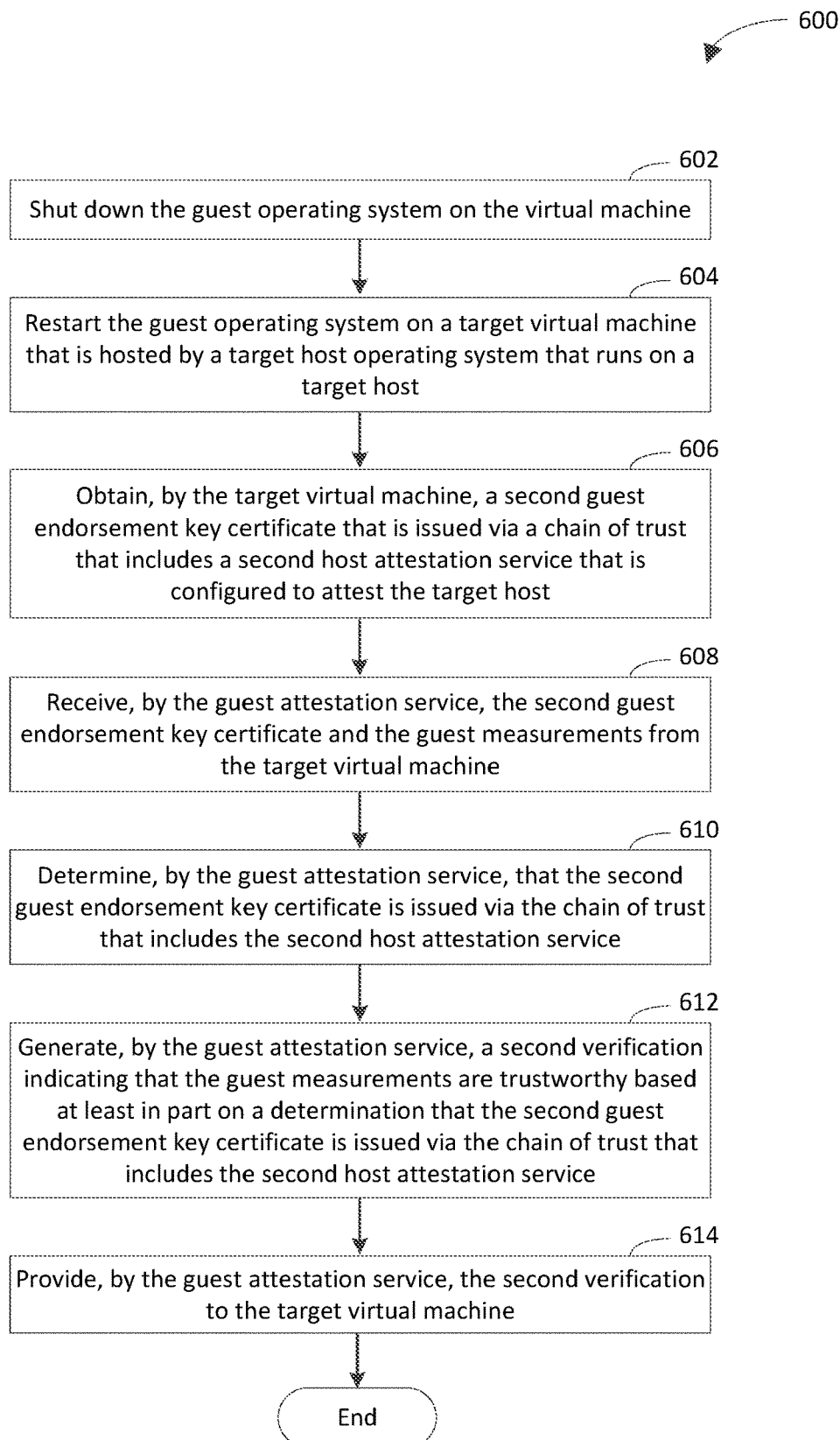

In yet another embodiment, the method of flowchart 400 further includes one or more of the steps shown in flowchart 600 of FIG. 6. In the embodiment of FIG. 6, the host is a source host from which the guest operating system is to be migrated. For instance, host 204 may be the source host. As shown in FIG. 6, the method of flowchart 600 begins at step 602. In step 602, the guest operating system is shut down on the virtual machine. In an example implementation, guest virtual machine 214 shuts down the guest operating system on guest virtual machine 214.

At step 604, the guest operating system is restarted on a target virtual machine that is hosted by a target host operating system that runs on a target host. For instance, the target virtual machine may be target guest virtual machine 314b of FIG. 3, which is discussed in further detail below with reference to flowcharts 700 and 800 of respective FIGS. 7-8.

At step 606, a second guest endorsement key certificate is obtained by the target virtual machine. The second guest endorsement key certificate is issued via a chain of trust that includes a second host attestation service that is configured to attest the target host. The second guest endorsement key certificate includes the guest endorsement key. The second guest endorsement key certificate vouches for the guest measurements. The virtual trusted platform module is migrated from the host operating system that runs on the source host to the target host operating system based at least in part on the guest operating system being shut down on the virtual machine and being restarted on the target host. For example, target guest virtual machine 314b may obtain the second guest endorsement key certificate. In accordance with this example, the second guest endorsement key certificate may include the guest endorsement key 230. In further accordance with this example, the second guest endorsement key certificate vouches for the guest measurements 222. In further accordance with this example, operating system 210 and/or the target host operating system migrates the vTPM 216 from operating system 210 to the target host operating system based at least in part on the guest operating system being shut down on guest virtual machine 214 and being restarted on the target host.

At step 608, the second guest endorsement key certificate and the guest measurements are received by the guest attestation service from the target virtual machine. In an example implementation, guest attestation service 206 receives the second guest endorsement key certificate and the guest measurements 222 from the target virtual machine.

At step 610, a determination is made, by the guest attestation service, that the second guest endorsement key certificate is issued via the chain of trust that includes the second host attestation service. In an example implementation, guest attestation service 206 determines that the second guest endorsement key certificate is issued via the chain of trust that includes the second host attestation service.

At step 612, a second verification is generated by the guest attestation service based at least in part on a determination that the second guest endorsement key certificate is issued via the chain of trust that includes the second host attestation service. The second verification indicates that the guest measurements are trustworthy. In an example implementation, guest attestation service 206 generates the second verification, which indicates that the guest measurements 222 are trustworthy.

At step 614, the second verification is provided by the guest attestation service to the target virtual machine. In an example implementation, guest attestation service 206 provides the second verification to the target virtual machine.

Figure 7:
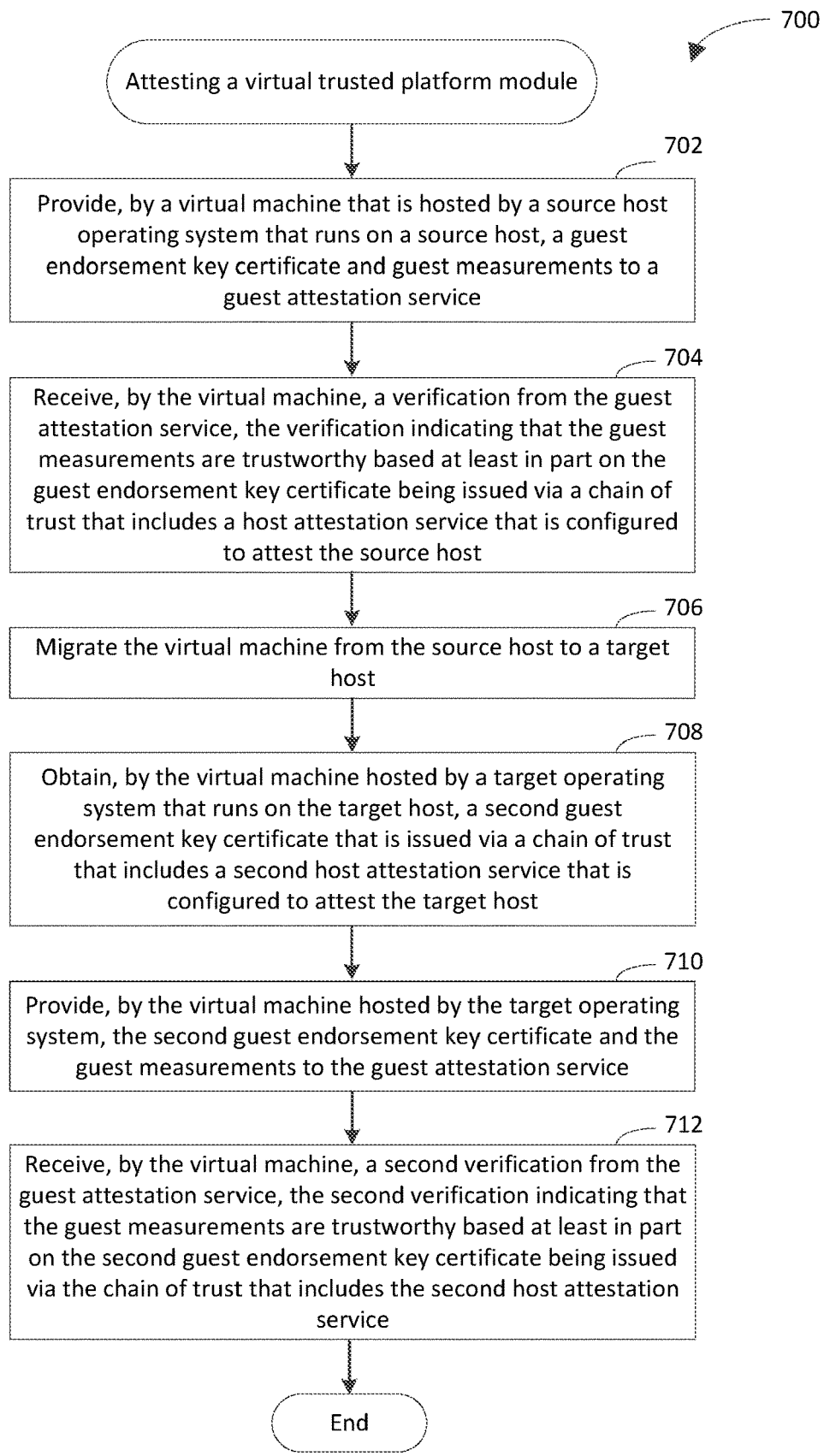

As shown in FIG. 7, the method of flowchart 700 begins at step 702. In step 702, a guest endorsement key certificate and guest measurements are provided to a guest attestation service by a virtual machine that is hosted by a source host operating system that runs on a source host. The guest endorsement key certificate includes a guest endorsement key associated with the virtual trusted platform module that is hosted by the source host operating system. The guest endorsement key certificate vouches for the guest measurements. The guest measurements indicate attributes of a guest operating system that runs on the virtual machine. In an example implementation, source guest virtual machine 314A, which is hosted by source host operating system 310a that runs on source host 304a, provides the guest endorsement key certificate 224 and the guest measurements 222 to guest attestation service 206. In accordance with this implementation, the guest endorsement key certificate 224 includes the guest endorsement key 230 associated with the source vTPM 316a that is hosted by the source host operating system 310a. The guest endorsement key certificate 224 vouches for the guest measurements 222. In further accordance with this implementation, the guest measurements 222 indicate attributes of the source guest operating system 346a that runs on the source guest virtual machine 314a.

At step 704, a verification is received by the virtual machine from the guest attestation service. The verification indicates that the guest measurements are trustworthy based at least in part on the guest endorsement key certificate being issued via a chain of trust that includes a host attestation service that is configured to attest the source host. In an example implementation, source guest virtual machine 314a receives the verification 228 from guest attestation service 206. The verification 228 indicates that the guest measurements 222 are trustworthy based at least in part on the guest endorsement key certificate 224 being issued via a chain of trust that includes the host attestation service 208, which is configured to attest source host 304a.

At step 706, the virtual machine is migrated from the source host to a target host. In an example implementation, source host operating system 310a and/or target host operating system 310b migrates source guest virtual machine 314a from source host 304a to target host 304b.

At step 708, a second guest endorsement key certificate is obtained by the virtual machine hosted by a target operating system that runs on the target host. The second guest endorsement key certificate is issued via a chain of trust that includes a second host attestation service that is configured to attest the target host. The second guest endorsement key certificate includes the guest endorsement key. The second guest endorsement key certificate vouches for the guest measurements. In an example implementation, source guest virtual machine 314a hosted by target host operating system 310b obtains the second guest endorsement key certificate. The second guest endorsement key certificate is issued via a chain of trust that includes a second host attestation service that is configured to attest target host 304b. The second host attestation service may be host attestation service 308, which is configured to attest source host 304a, or a different host attestation service. The second guest endorsement key certificate includes the guest endorsement key 230. The second guest endorsement key certificate vouches for the guest measurements 222.

At step 710, the second guest endorsement key certificate and the guest measurements are provided to the guest attestation service by the virtual machine hosted by the target operating system. In an example implementation, source guest virtual machine 314a hosted by target host operating system 310b provides the second guest endorsement key certificate and the guest measurements 222 to guest attestation service 206.

At step 712, a second verification is received by the virtual machine from the guest attestation service. The second verification indicates that the guest measurements are trustworthy based at least in part on the second guest endorsement key certificate being issued via the chain of trust that includes the second host attestation service. In an example implementation, source guest virtual machine 314a receives the second verification from guest attestation service 206. The second verification indicates that the guest measurements 222 are trustworthy based at least in part on the second guest endorsement key certificate being issued via the chain of trust that includes the second host attestation service.

In some example embodiments, one or more steps 702, 704, 706, 708, 710, and/or 712 of flowchart 700 may not be performed. Moreover, steps in addition to or in lieu of steps 702, 704, 706, 708, 710, and/or 712 may be performed. For instance, in an example embodiment, the method of flowchart 700 further includes providing, by the target host operating system, a host endorsement key certificate and host measurements to the second host attestation service. The host endorsement key certificate vouches for the host measurements. The host measurements indicate attributes of the target host operating system. For example, target host operating system 310b provides the host endorsement key certificate and the host measurements to the second host attestation service. In accordance with this example, the host measurements indicate attributes of target host operating system 310b. In accordance with this embodiment, the method of flowchart 700 further includes receiving, by the target host operating system, a host signing key certificate from the second host attestation service based at least in part on the host endorsement key certificate and the host measurements being provided to the second host attestation service. The host signing key certificate includes a public portion of a host signing key that corresponds to a private portion of the host signing key that is used to sign the second guest endorsement key certificate. For example, target host operating system 301b receives the host signing key certificate from the second host attestation service.

In an aspect of this embodiment, providing the second guest endorsement key certificate and the guest measurements at step 710 includes providing the second guest endorsement key certificate, the guest measurements, and the host signing key certificate to the guest attestation service by the virtual machine hosted by the target operating system. For instance, source guest virtual machine 314a hosted by target host operating system 310b may provide the second guest endorsement key certificate, the guest measurements, and the host signing key certificate to guest attestation service 206. In accordance with this aspect, receiving the second verification at step 712 is based at least in part on the second guest endorsement key certificate, the guest measurements, and the host signing key certificate being provided to the guest attestation service by the virtual machine. For instance, source guest virtual machine 314a may receive the second verification based at least in part on the second guest endorsement key certificate, the guest measurements, and the host signing key certificate being provided to guest attestation service 206 by source guest virtual machine 314a.

In another example embodiment, the method of flowchart 700 further includes providing, by the virtual machine hosted by the target operating system, the guest endorsement key to the second host attestation service. For instance, source guest virtual machine 314a hosted by target host operating system 310b provides the guest endorsement key to the second host attestation service. In accordance with this embodiment, the method of flowchart 700 further includes receiving, by the virtual machine, the second guest endorsement key certificate from the second host attestation service. For instance, source guest virtual machine 314a receives the second guest endorsement key certificate from the second host attestation service.

Figure 8:
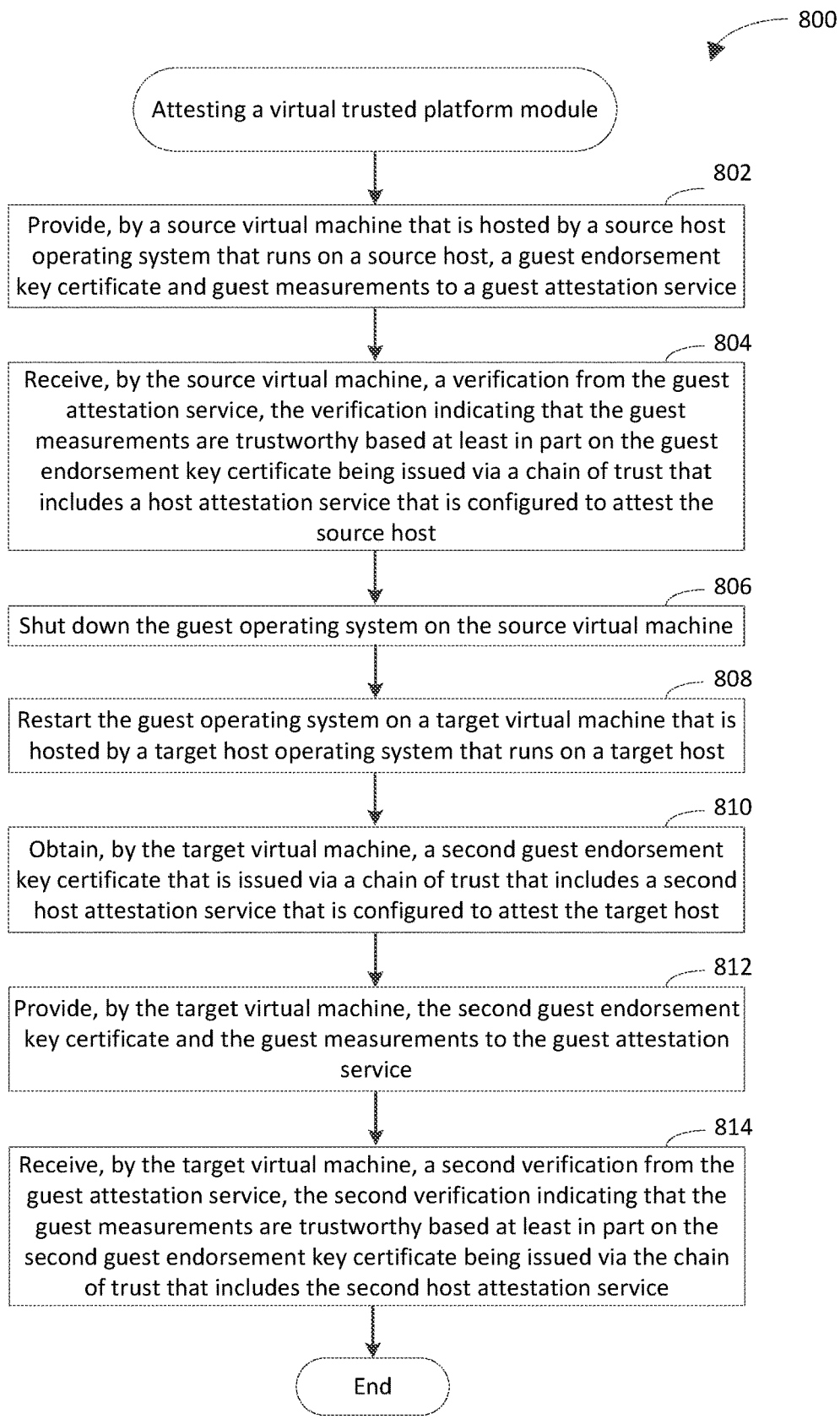

As shown in FIG. 8, the method of flowchart 800 begins at step 802. In step 802, a guest endorsement key certificate and guest measurements are provided to a guest attestation service by a source virtual machine that is hosted by a source host operating system that runs on a source host. The guest endorsement key certificate includes a guest endorsement key associated with the virtual trusted platform module that is hosted by the source host operating system. The guest endorsement key certificate vouches for the guest measurements. The guest measurements indicate attributes of a guest operating system that runs on the source virtual machine. In an example implementation, source guest virtual machine 314a, which is hosted by source host operating system 310a that runs on source host 304a, provides the guest endorsement key certificate 224 and the guest measurements 222 to guest attestation service 206. In accordance with this implementation, the guest endorsement key certificate 224 includes a guest endorsement key 230 associated with source vTPM 316a, which is hosted by source host operating system 310a. The guest endorsement key certificate 224 vouches for the guest measurements 222. In further accordance with this implementation, the guest measurements 222 indicate attributes of source guest operating system 346a that runs on source guest virtual machine 314a.

At step 804, a verification is received by the source virtual machine from the guest attestation service. The verification indicates that the guest measurements are trustworthy based at least in part on the guest endorsement key certificate being issued via a chain of trust that includes a host attestation service that is configured to attest the source host. In an example implementation, source guest virtual machine 314a receives the verification 228 from guest attestation service 206. The verification 228 indicates that the guest measurements 222 are trustworthy based at least in part on the guest endorsement key certificate 224 being issued via a chain of trust that includes host attestation service 208, which is configured to attest source host 304a.

At step 806, the guest operating system is shut down on the source virtual machine. In an example implementation, source guest virtual machine 314a shuts down source guest operating system 346a on source guest virtual machine 314a.

At step 808, the guest operating system is restarted on a target virtual machine that is hosted by a target host operating system that runs on a target host. In an example implementation, target guest virtual machine 314b restarts source guest operating system 346a on target guest virtual machine 314b. In accordance with this implementation, target guest virtual machine 314b is hosted by target host operating system 310b, which runs on target host 304b, At step 810, a second guest endorsement key certificate is obtained by the target virtual machine. The second guest endorsement key certificate is issued via a chain of trust that includes a second host attestation service that is configured to attest the target host. The second guest endorsement key certificate includes the guest endorsement key. The second guest endorsement key certificate vouches for the guest measurements. The virtual trusted platform module is migrated from the source host operating system to the target host operating system based at least in part on the guest operating system being shut down on the source virtual machine and being restarted on the target virtual machine. In an example implementation, target guest virtual machine 314b obtains the second guest endorsement key certificate. In accordance with this implementation, the second host attestation service is configured to attest target host 304b. The second guest endorsement key certificate includes guest endorsement key 230. The second guest endorsement key certificate vouches for the guest measurements 222. Tin further accordance with this implementation, the source vTPM 316a is migrated from source host operating system 310a to target host operating system 310b based at least in part on source guest operating system 346a being shut down on source guest virtual machine 314a and being restarted on target guest virtual machine 314b.

At step 812, the second guest endorsement key certificate and the guest measurements are provided by the target virtual machine to the guest attestation service. In an example implementation, target guest virtual machine 314b provides the second guest endorsement key certificate and the guest measurements 222 to guest attestation service 206.

At step 814, a second verification is received by the target virtual machine from the guest attestation service. The second verification indicates that the guest measurements are trustworthy based at least in part on the second guest endorsement key certificate being issued via the chain of trust that includes the second host attestation service. In an example implementation, target guest virtual machine 314b receives the second verification from guest attestation service 206. The second verification indicates that the guest measurements 222 are trustworthy based at least in part on the second guest endorsement key certificate being issued via the chain of trust that includes the second host attestation service.

In some example embodiments, one or more steps 802, 804, 806, 808, 810, 812, and/or 814 of flowchart 800 may not be performed. Moreover, steps in addition to or in lieu of steps 802, 804, 806, 808, 810, 812, and/or 814 may be performed. For instance, in an example embodiment, the method of flowchart 800 further includes providing, by the target host operating system, a host endorsement key certificate and host measurements to the second host attestation service. The host endorsement key certificate vouches for the host measurements. The host measurements indicate attributes of the target host operating system. For example, target host operating system 310b provides the host endorsement key certificate and the host measurements to the second host attestation service. In accordance with this example, the host measurements indicate attributes of target host operating system 310b. In accordance with this embodiment, the method of flowchart 800 further includes receiving, by the target host operating system, a host signing key certificate from the second host attestation service based at least in part on the host endorsement key certificate and the host measurements being provided to the second host attestation service. The host signing key certificate includes a public portion of a host signing key that corresponds to a private portion of the host signing key that is used to sign the second guest endorsement key certificate. For instance, target host operating system 310b receives the host signing key certificate from the second host attestation service.

In another example embodiment, providing the second guest endorsement key certificate and the guest measurements at step 812 includes providing, by the target virtual machine, the second guest endorsement key certificate, the guest measurements, and the host signing key certificate to the guest attestation service. For instance, target guest virtual machine 314b may provide the second guest endorsement key certificate, the guest measurements, and the host signing key certificate to guest attestation service 206. In accordance with this embodiment, receiving the second verification at step 814 is based at least in part on the second guest endorsement key certificate, the guest measurements, and the host signing key certificate being provided to the guest attestation service by the target virtual machine. For instance, target guest virtual machine 314b may receive the second verification based at least in part on the second guest endorsement key certificate, the guest measurements, and the host signing key certificate being provided to guest attestation service 206 by target guest virtual machine 314b.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of user systems 102A-102M, any one or more of servers 106A-106N, vTPM attestation logic 108, vTPM attestation logic 202, host 204, guest attestation service 206, host attestation service 208, vTPM attestation logic 302, source host 304a, target host 304b, flowchart 400, flowchart 500, flowchart 600, flowchart 700, and/or flowchart 800 may be implemented in hardware, software, firmware, or any combination thereof.

For example, any one or more of user systems 102A-102M, any one or more of servers 106A-106N, vTPM attestation logic 108, vTPM attestation logic 202, host 204, guest attestation service 206, host attestation service 208, operating system 210, guest virtual machine 214, vTPM 216, driver 218, driver 220, vTPM attestation logic 302, source host 304a, target host 304b, source host operating system 310a, target host operating system 310b, source guest virtual machine 314a, target guest virtual machine 314b, source vTPM 316a, target vTPM 316b, source guest operating system 346a, target guest operating system 346b, flowchart 400, flowchart 500, flowchart 600, flowchart 700, and/or flowchart 800 may be implemented, at least in part, as computer program code configured to be executed in one or more processors.

In another example, any one or more of user systems 102A-102M, any one or more of servers 106A-106N, vTPM attestation logic 108, vTPM attestation logic 202, host 204, guest attestation service 206, host attestation service 208, TPM 212, vTPM attestation logic 302, source host 304a, target host 304b, source TPM 312a, target TPM 312b, flowchart 400, flowchart 500, flowchart 600, flowchart 700, and/or flowchart 800 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

An example system to attest a virtual trusted platform module comprises, memory, one or more processors coupled to the memory, and a guest attestation service implemented using at least one of the one or more processors to attest a virtual machine that is hosted by a host operating system configured to run on a host. The guest attestation service is configured to receive a guest endorsement key certificate and guest measurements from the virtual machine. The guest endorsement key certificate includes a guest endorsement key associated with the virtual trusted platform module that is hosted by the host operating system. The guest endorsement key certificate vouches for the guest measurements. The guest measurements indicate attributes of a guest operating system configured to run on the virtual machine. The guest attestation service is further configured to determine whether the guest endorsement key certificate is issued via a chain of trust that includes a host attestation service that is configured to attest the host. The guest attestation service is further configured to generate a verification indicating that the guest measurements are trustworthy based at least in part on a determination that the guest endorsement key certificate is issued via the chain of trust that includes the host attestation service. The guest attestation service is further configured to provide the verification to the virtual machine.

In a first aspect of the example system, the guest attestation service is configured to receive a host signing key certificate from the virtual machine. In accordance with the first aspect, the host signing key certificate is certified by a host attestation service that is configured to attest the host. In further accordance with the first aspect, the host signing key certificate includes a public portion of a host signing key that corresponds to a private portion of the host signing key that is used to sign the guest endorsement key certificate. In further accordance with the first aspect, the guest attestation service is further configured to determine that the guest endorsement key certificate is issued via the chain of trust that includes the host attestation service by verifying that the host signing key was used to issue the guest endorsement key certificate.

In a second aspect of the example system, the guest attestation service is configured to receive a host signing key certificate from a host attestation service that certifies the host signing key rather than from the virtual machine, the host attestation service configured to attest the host. In accordance with the second aspect, the host signing key certificate includes a public portion of a host signing key that corresponds to a private portion of the host signing key that is used to sign the guest endorsement key certificate. In further accordance with the second aspect, the guest attestation service is further configured to determine that the guest endorsement key certificate is issued via the chain of trust that includes the host attestation service by verifying that the host signing key was used to issue the guest endorsement key certificate. The second aspect of the example system may be implemented in combination with the first aspect of the example system, though the example embodiments are not limited in this respect.

In a third aspect of the example system, the guest attestation service is configured to determine that the guest endorsement key certificate is issued via the chain of trust that includes the host attestation service based at least in part on the endorsement key being signed by the host attestation service to issue the guest endorsement key certificate to the virtual trusted platform module. The third aspect of the example system may be implemented in combination with the first and/or second aspect of the example system, though the example embodiments are not limited in this respect.

In a fourth aspect of the example system, the example system further comprises the host operating system configured to provide a host endorsement key certificate and host measurements to a host attestation service, the host endorsement key certificate vouching for the host measurements, the host measurements indicating attributes of the host operating system. In accordance with the fourth aspect, the host operating system is further configured to receive a host signing key certificate from the host attestation service based at least in part on the host endorsement key certificate and the host measurements being provided to the host attestation service. The host signing key certificate includes a public portion of a host signing key that corresponds to a private portion of the host signing key that is used to sign the guest endorsement key certificate. The fourth aspect of the example system may be implemented in combination with the first, second, and/or third aspect of the example system, though the example embodiments are not limited in this respect.

In an example of the fourth aspect of the example system, the guest attestation service is configured to receive the host signing key certificate from the virtual machine. In accordance with this example, the guest attestation service is further configured to provide the verification to the virtual machine based at least in part on the guest endorsement key certificate, the guest measurements, and the host signing key certificate being received by the guest attestation service from the virtual machine.

In a fifth aspect of the example system, the example system further comprises the virtual machine hosted by the host operating system. In accordance with the fifth aspect, the virtual machine is configured to provide the guest endorsement key to the host attestation service. In further accordance with the fifth aspect, the virtual machine is further configured to receive the guest endorsement key certificate from the host attestation service. The fifth aspect of the example system may be implemented in combination with the first, second, third, and/or fourth aspect of the example system, though the example embodiments are not limited in this respect.

In a sixth aspect of the example system, the host is a source host from which the virtual machine is to be migrated. In accordance with the sixth aspect, the example system further comprises the source host, the host operating system configured to run on the source host, a target host, and a target operating system configured to run on the target host. In further accordance with the sixth aspect, at least one of the host operating system, which runs on the source host, or the target operating system is configured to migrate the virtual machine from the source host to the target host. In further accordance with the sixth aspect, the virtual machine hosted by the target operating system is configured to obtain a second guest endorsement key certificate that is issued via a chain of trust that includes a second host attestation service that is configured to attest the target host. In further accordance with the sixth aspect, the second guest endorsement key certificate includes the guest endorsement key. In further accordance with the sixth aspect, the second guest endorsement key certificate vouches for the guest measurements. The sixth aspect of the example system may be implemented in combination with the first, second, third, fourth, and/or fifth aspect of the example system, though the example embodiments are not limited in this respect.

In an example of the fourth aspect of the example system, the guest attestation service is configured to receive the second guest endorsement key certificate and the guest measurements from the virtual machine hosted by the target operating system. In accordance with this example, the guest attestation service is further configured to determine whether the second guest endorsement key certificate is issued via the chain of trust that includes the second host attestation service. In further accordance with this example, the guest attestation service is further configured to generate a second verification indicating that the guest measurements are trustworthy based at least in part on a determination that the second guest endorsement key certificate is issued via the chain of trust that includes the second host attestation service. In further accordance with this example, the guest attestation service is further configured to provide the second verification to the virtual machine hosted by the target operating system.

In a seventh aspect of the example system, the host is a source host from which the guest operating system is to be migrated. In accordance with the seventh aspect, the example system further comprises the source host, the host operating system configured to run on the source host, the virtual machine that is hosted by the host operating system, a target host, a target host operating system configured to run on the target host, and a target virtual machine that is hosted by the target host operating system. In further accordance with the seventh aspect, the virtual machine that is hosted by the host operating system is configured to shut down the guest operating system on the virtual machine. In further accordance with the seventh aspect, the target virtual machine is configured to restart the guest operating system on the target virtual machine. In further accordance with the seventh aspect, the target virtual machine is further configured to obtain a second guest endorsement key certificate that is issued via a chain of trust that includes a second host attestation service that is configured to attest the target host. In further accordance with the seventh aspect, the second guest endorsement key certificate includes the guest endorsement key. In further accordance with the seventh aspect, the second guest endorsement key certificate vouches for the guest measurements. In further accordance with the seventh aspect, at least one of the host operating system configured to run on the source host or the target host operating system is configured to migrate the virtual trusted platform module from the host operating system configured to run on the source host to the target host operating system based at least in part on the guest operating system being shut down on the virtual machine and being restarted on the target host. The seventh aspect of the example system may be implemented in combination with the first, second, third, fourth, fifth, and/or sixth aspect of the example system, though the example embodiments are not limited in this respect.

In an example of the seventh aspect of the example system, the guest attestation service is configured to receive the second guest endorsement key certificate and the guest measurements from the target virtual machine. In accordance with this example, the guest attestation service is further configured to determine that the second guest endorsement key certificate is issued via the chain of trust that includes the second host attestation service. In further accordance with this example, the guest attestation service is further configured to generate a second verification indicating that the guest measurements are trustworthy based at least in part on a determination that the second guest endorsement key certificate is issued via the chain of trust that includes the second host attestation service. In further accordance with this example, the guest attestation service is further configured to provide the second verification to the target virtual machine.

In a first example method of attesting a virtual trusted platform module, a guest endorsement key certificate and guest measurements are provided to a guest attestation service by a virtual machine that is hosted by a source host operating system that runs on a source host. The guest endorsement key certificate includes a guest endorsement key associated with the virtual trusted platform module that is hosted by the source host operating system. The guest endorsement key certificate vouches for the guest measurements. The guest measurements indicate attributes of a guest operating system that runs on the virtual machine. A verification is received by the virtual machine from the guest attestation service. The verification indicates that the guest measurements are trustworthy based at least in part on the guest endorsement key certificate being issued via a chain of trust that includes a host attestation service that is configured to attest the source host. The virtual machine is migrated from the source host to a target host. A second guest endorsement key certificate that is issued via a chain of trust that includes a second host attestation service that is configured to attest the target host is obtained by the virtual machine hosted by a target operating system that runs on the target host. The second guest endorsement key certificate includes the guest endorsement key. The second guest endorsement key certificate vouches for the guest measurements.

In a first aspect of the first example method, the first example method further comprises providing, by the virtual machine hosted by the target operating system, the second guest endorsement key certificate and the guest measurements to the guest attestation service. In accordance with the first aspect, the first example method further comprises receiving, by the virtual machine, a second verification from the guest attestation service. In accordance with the first aspect, the second verification indicates that the guest measurements are trustworthy based at least in part on the second guest endorsement key certificate being issued via the chain of trust that includes the second host attestation service.

In a first example of the first aspect, the first example method further comprises providing, by the target host operating system, a host endorsement key certificate and host measurements to the second host attestation service. In accordance with the first example, the host endorsement key certificate vouches for the host measurements. In further accordance with the first example, the host measurements indicate attributes of the target host operating system. In further accordance with the first example, the first example method further comprises receiving, by the target host operating system, a host signing key certificate from the second host attestation service based at least in part on the host endorsement key certificate and the host measurements being provided to the second host attestation service. In further accordance with the first example, the host signing key certificate includes a public portion of a host signing key that corresponds to a private portion of the host signing key that is used to sign the second guest endorsement key certificate.

In an implementation of the first example, providing the second guest endorsement key certificate and the guest measurements to the guest attestation service comprises providing, by the virtual machine hosted by the target operating system, the second guest endorsement key certificate, the guest measurements, and the host signing key certificate to the guest attestation service. In accordance with this implementation, receiving the second verification comprises receiving, by the virtual machine, the second verification from the guest attestation service based at least in part on the second guest endorsement key certificate, the guest measurements, and the host signing key certificate being provided to the guest attestation service by the virtual machine.

In a second example of the first aspect, the first example method further comprises providing, by the virtual machine hosted by the target operating system, the guest endorsement key to the second host attestation service. In accordance with the second example, the first example method further comprises receiving, by the virtual machine, the second guest endorsement key certificate from the second host attestation service.

In a second example method of attesting a virtual trusted platform module, a guest endorsement key certificate and guest measurements are provided to a guest attestation service by a source virtual machine that is hosted by a source host operating system that runs on a source host. The guest endorsement key certificate includes a guest endorsement key associated with the virtual trusted platform module that is hosted by the source host operating system. The guest endorsement key certificate vouches for the guest measurements. The guest measurements indicate attributes of a guest operating system that runs on the source virtual machine. A verification is received by the source virtual machine from the guest attestation service. The verification indicates that the guest measurements are trustworthy based at least in part on the guest endorsement key certificate being issued via a chain of trust that includes a host attestation service that is configured to attest the source host. The guest operating system is shut down on the source virtual machine. The guest operating system is restarted on a target virtual machine that is hosted by a target host operating system that runs on a target host. A second guest endorsement key certificate that is issued via a chain of trust that includes a second host attestation service that is configured to attest the target host is obtained by the target virtual machine. The second guest endorsement key certificate includes the guest endorsement key. The second guest endorsement key certificate vouches for the guest measurements. The virtual trusted platform module is migrated from the source host operating system to the target host operating system based at least in part on the guest operating system being shut down on the source virtual machine and being restarted on the target virtual machine.

In an aspect of the second example method, the second example method further comprises providing, by the target virtual machine, the second guest endorsement key certificate and the guest measurements to the guest attestation service. In accordance with this aspect, the second example method further comprises receiving, by the target virtual machine, a second verification from the guest attestation service. In further accordance with this aspect, the second verification indicates that the guest measurements are trustworthy based at least in part on the second guest endorsement key certificate being issued via the chain of trust that includes the second host attestation service.

In a first example of this aspect, the second example method further comprises providing, by the target host operating system, a host endorsement key certificate and host measurements to the second host attestation service. In accordance with the first example, the host endorsement key certificate vouches for the host measurements. In further accordance with the first example, the host measurements indicate attributes of the target host operating system. In further accordance with the first example, the second example method further comprises receiving, by the target host operating system, a host signing key certificate from the second host attestation service based at least in part on the host endorsement key certificate and the host measurements being provided to the second host attestation service. In further accordance with the first example, the host signing key certificate includes a public portion of a host signing key that corresponds to a private portion of the host signing key that is used to sign the second guest endorsement key certificate.

In a second example of this aspect, providing the second guest endorsement key certificate and the guest measurements to the guest attestation service comprises providing, by the target virtual machine, the second guest endorsement key certificate, the guest measurements, and the host signing key certificate to the guest attestation service. In accordance with the second example, receiving the second verification comprises receiving, by the target virtual machine, the second verification from the guest attestation service based at least in part on the second guest endorsement key certificate, the guest measurements, and the host signing key certificate being provided to the guest attestation service by the target virtual machine.

A first computer program product comprising a computer-readable medium having instructions stored thereon for enabling a processor-based system to perform operations comprising provide, by a virtual machine that is hosted by a source host operating system that runs on a source host, a guest endorsement key certificate and guest measurements to a guest attestation service. The guest endorsement key certificate includes a guest endorsement key associated with the virtual trusted platform module that is hosted by the source host operating system. The guest endorsement key certificate vouches for the guest measurements. The guest measurements indicate attributes of a guest operating system that runs on the virtual machine. The operations further comprise receive, by the virtual machine, a verification from the guest attestation service. The verification indicates that the guest measurements are trustworthy based at least in part on the guest endorsement key certificate being issued via a chain of trust that includes a host attestation service that is configured to attest the source host. The operations further comprise migrate the virtual machine from the source host to a target host. The operations further comprise obtain, by the virtual machine hosted by a target operating system that runs on the target host, a second guest endorsement key certificate that is issued via a chain of trust that includes a second host attestation service that is configured to attest the target host. The second guest endorsement key certificate includes the guest endorsement key. The second guest endorsement key certificate vouches for the guest measurements.

A second computer program product comprising a computer-readable medium having instructions stored thereon for enabling a processor-based system to perform operations comprising provide, by a source virtual machine that is hosted by a source host operating system that runs on a source host, a guest endorsement key certificate and guest measurements to a guest attestation service. The guest endorsement key certificate includes a guest endorsement key associated with the virtual trusted platform module that is hosted by the source host operating system. The guest endorsement key certificate vouches for the guest measurements. The guest measurements indicate attributes of a guest operating system that runs on the source virtual machine. The operations further comprise receive, by the source virtual machine, a verification from the guest attestation service. The verification indicates that the guest measurements are trustworthy based at least in part on the guest endorsement key certificate being issued via a chain of trust that includes a host attestation service that is configured to attest the source host. The operations further comprise shut down the guest operating system on the source virtual machine. The operations further comprise restart the guest operating system on a target virtual machine that is hosted by a target host operating system that runs on a target host. The operations further comprise obtain, by the target virtual machine, a second guest endorsement key certificate that is issued via a chain of trust that includes a second host attestation service that is configured to attest the target host. The second guest endorsement key certificate includes the guest endorsement key. The second guest endorsement key certificate vouches for the guest measurements. The virtual trusted platform module is migrated from the source host operating system to the target host operating system based at least in part on the guest operating system being shut down on the source virtual machine and being restarted on the target virtual machine.

IV. Example Computer System

Figure 9:
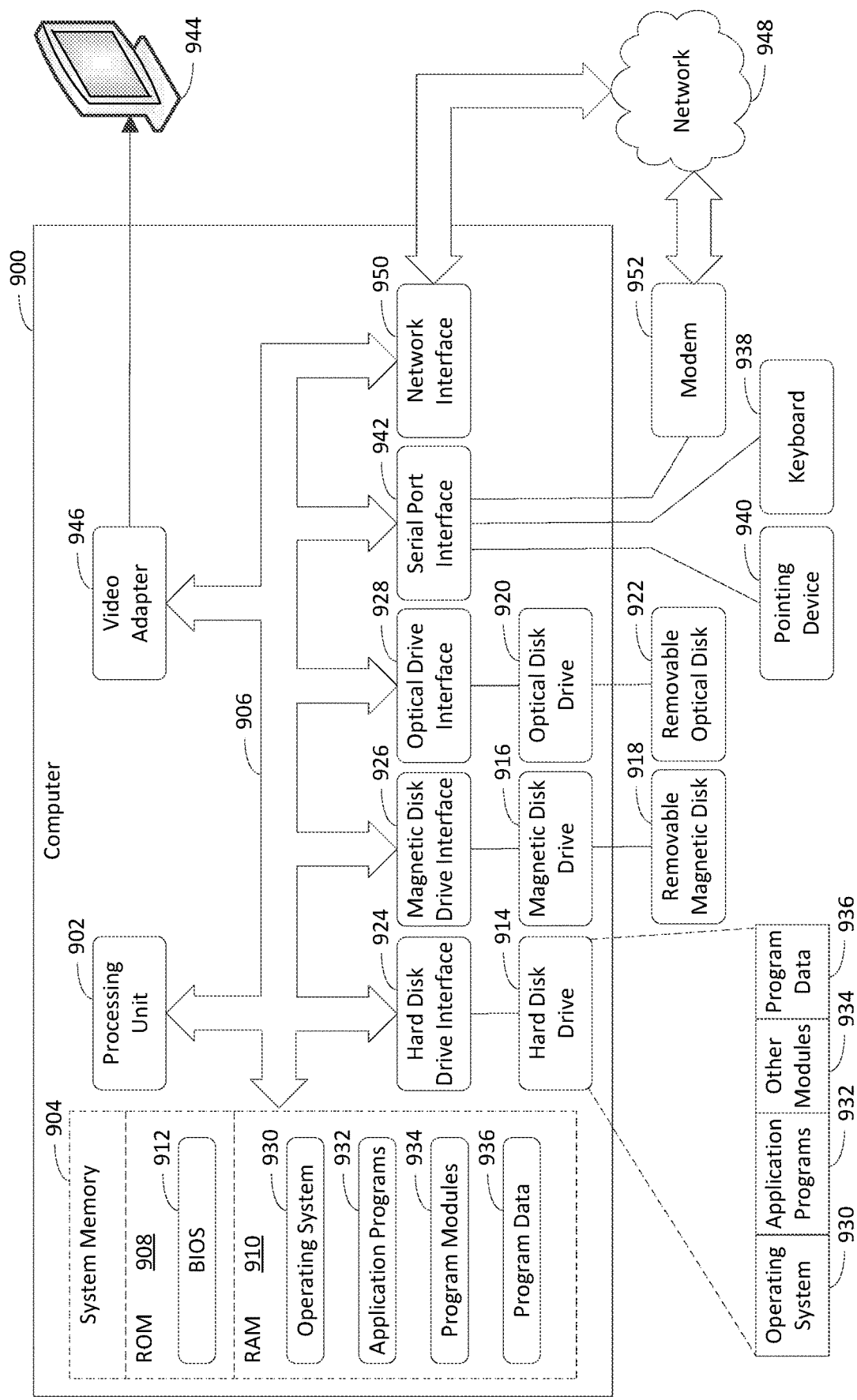
FIG. 9 depicts an example computer in which embodiments may be implemented.

FIG. 9 depicts an example computer 900 in which embodiments may be implemented. Any one or more of user systems 102A-102M and/or any one or more of servers 106A-106N shown in FIG. 1, computing system 200 shown in FIG. 2, and/or computing system 300 shown in FIG. 3 may be implemented using computer 900, including one or more features of computer 900 and/or alternative features. Computer 900 may be a general-purpose computing device in the form of a conventional personal computer, a mobile computer, or a workstation, for example, or computer 900 may be a special purpose computing device. The description of computer 900 provided herein is provided for purposes of illustration, and is not intended to be limiting. Embodiments may be implemented in further types of computer systems, as would be known to persons skilled in the relevant art(s).

As shown in FIG. 9, computer 900 includes a processing unit 902, a system memory 904, and a bus 906 that couples various system components including system memory 904 to processing unit 902. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computer 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 930, one or more application programs 932, other program modules 934, and program data 936. Application programs 932 or program modules 934 may include, for example, computer program logic for implementing any one or more of (e.g., at least a portion of) vTPM attestation logic 108, vTPM attestation logic 202, host 204, guest attestation service 206, host attestation service 208, operating system 210, guest virtual machine 214, vTPM 216, driver 218, driver 220, vTPM attestation logic 302, source host 304a, target host 304b, source host operating system 310a, target host operating system 310b, source guest virtual machine 314a, target guest virtual machine 314b, source vTPM 316a, target vTPM 316b, source guest operating system 346a, target guest operating system 346b, flowchart 400 (including any step of flowchart 400), flowchart 500 (including any step of flowchart 500), flowchart 600 (including any step of flowchart 600), flowchart 700 (including any step of flowchart 700), and/or flowchart 800 (including any step of flowchart 800), as described herein.

A user may enter commands and information into the computer 900 through input devices such as keyboard 938 and pointing device 940. Other input devices (not shown) may include a microphone, joystick, game pad, satellite dish, scanner, touch screen, camera, accelerometer, gyroscope, or the like. These and other input devices are often connected to the processing unit 902 through a serial port interface 942 that is coupled to bus 906, but may be connected by other interfaces, such as a parallel port, game port, or a universal serial bus (USB).

A display device 944 (e.g., a monitor) is also connected to bus 906 via an interface, such as a video adapter 946. In addition to display device 944, computer 900 may include other peripheral output devices (not shown) such as speakers and printers.

Computer 900 is connected to a network 948 (e.g., the Internet) through a network interface or adapter 950, a modem 952, or other means for establishing communications over the network. Modem 952, which may be internal or external, is connected to bus 906 via serial port interface 942.

As used herein, the terms "computer program medium" and "computer-readable storage medium" are used to generally refer to media (e.g., non-transitory media) such as the hard disk associated with hard disk drive 914, removable magnetic disk 918, removable optical disk 922, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950 or serial port interface 942. Such computer programs, when executed or loaded by an application, enable computer 900 to implement features of embodiments discussed herein. Accordingly, such computer programs represent controllers of the computer 900.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to attest a virtual trusted platform module, the system comprising:
   memory;
   one or more processors coupled to the memory; and
   a guest attestation service implemented using at least one of the one or more processors to attest a virtual machine that is different from the virtual trusted platform module and that is hosted by a host operating system configured to run on a host, the guest attestation service configured to:
      receive a guest endorsement key certificate and guest measurements from the virtual machine,
         the guest endorsement key certificate including a guest endorsement key associated with the virtual trusted platform module that is hosted by the host operating system,
         the guest endorsement key certificate vouching for the guest measurements,
         the guest measurements indicating attributes of a guest operating system configured to run on the virtual machine;
      determine whether the guest endorsement key certificate is issued via a chain of trust that includes a host attestation service that is configured to attest the host;
      generate a verification indicating that the guest measurements are trustworthy based at least in part on a determination that the guest endorsement key certificate is issued via the chain of trust that includes the host attestation service; and
      provide the verification to the virtual machine.

2. The system of claim 1, wherein the guest attestation service is configured to:
   receive a host signing key certificate from the virtual machine,
      the host signing key certificate certified by the host attestation service,
      the host signing key certificate including a public portion of a host signing key that corresponds to a private portion of the host signing key that is used to sign the guest endorsement key certificate; and
   determine that the guest endorsement key certificate is issued via the chain of trust that includes the host attestation service by verifying that the host signing key was used to issue the guest endorsement key certificate.

3. The system of claim 1, wherein the guest attestation service is configured to:
   receive a host signing key certificate from the host attestation service that certifies a host signing key rather than from the virtual machine,
      the host signing key certificate including a public portion of the host signing key that corresponds to a private portion of the host signing key that is used to sign the guest endorsement key certificate; and
   determine that the guest endorsement key certificate is issued via the chain of trust that includes the host attestation service by verifying that the host signing key was used to issue the guest endorsement key certificate.

4. The system of claim 1, wherein the guest attestation service is configured to:

determine that the guest endorsement key certificate is issued via the chain of trust that includes the host attestation service based at least in part on the guest endorsement key being signed by the host attestation service to issue the guest endorsement key certificate to the virtual trusted platform module.

5. The system of claim 1, further comprising:
the host operating system configured to:
provide a host endorsement key certificate and host measurements to the host attestation service, the host endorsement key certificate vouching for the host measurements, the host measurements indicating attributes of the host operating system; and
receive a host signing key certificate from the host attestation service based at least in part on the host endorsement key certificate and the host measurements being provided to the host attestation service, the host signing key certificate including a public portion of a host signing key that corresponds to a private portion of the host signing key that is used to sign the guest endorsement key certificate.

6. The system of claim 5, wherein the guest attestation service is configured to:
receive the host signing key certificate from the virtual machine; and
provide the verification to the virtual machine based at least in part on the guest endorsement key certificate, the guest measurements, and the host signing key certificate being received by the guest attestation service from the virtual machine.

7. The system of claim 1, further comprising:
the virtual machine hosted by the host operating system, the virtual machine configured to:
provide the guest endorsement key to the host attestation service; and
receive the guest endorsement key certificate from the host attestation service.

8. The system of claim 1, wherein the host is a source host from which the virtual machine is to be migrated; and
wherein the system further comprises:
the source host;
the host operating system configured to run on the source host;
a target host; and
a target operating system configured to run on the target host;
wherein at least one of the host operating system, which runs on the source host, or the target operating system is configured to migrate the virtual machine from the source host to the target host; and
wherein the virtual machine hosted by the target operating system is configured to obtain a second guest endorsement key certificate that is issued via a chain of trust that includes a second host attestation service that is configured to attest the target host,
the second guest endorsement key certificate including the guest endorsement key,
the second guest endorsement key certificate vouching for the guest measurements.

9. The system of claim 8, wherein the guest attestation service is configured to:
receive the second guest endorsement key certificate and the guest measurements from the virtual machine hosted by the target operating system;
determine whether the second guest endorsement key certificate is issued via the chain of trust that includes the second host attestation service;
generate a second verification indicating that the guest measurements are trustworthy based at least in part on a determination that the second guest endorsement key certificate is issued via the chain of trust that includes the second host attestation service; and
provide the second verification to the virtual machine hosted by the target operating system.

10. The system of claim 1, wherein the host is a source host from which the guest operating system is to be migrated;
wherein the system further comprises:
the source host;
the host operating system configured to run on the source host;
the virtual machine that is hosted by the host operating system;
a target host;
a target host operating system configured to run on the target host; and
a target virtual machine that is hosted by the target host operating system;
wherein the virtual machine that is hosted by the host operating system is configured to shut down the guest operating system on the virtual machine;
wherein the target virtual machine is configured to:
restart the guest operating system on the target virtual machine; and
obtain a second guest endorsement key certificate that is issued via a chain of trust that includes a second host attestation service that is configured to attest the target host,
the second guest endorsement key certificate including the guest endorsement key,
the second guest endorsement key certificate vouching for the guest measurements; and
wherein at least one of the host operating system configured to run on the source host or the target host operating system is configured to migrate the virtual trusted platform module from the host operating system configured to run on the source host to the target host operating system based at least in part on the guest operating system being shut down on the virtual machine and being restarted on the target host.

11. The system of claim 10, wherein the guest attestation service is configured to:
receive the second guest endorsement key certificate and the guest measurements from the target virtual machine;
determine that the second guest endorsement key certificate is issued via the chain of trust that includes the second host attestation service;
generate a second verification indicating that the guest measurements are trustworthy based at least in part on a determination that the second guest endorsement key certificate is issued via the chain of trust that includes the second host attestation service; and
provide the second verification to the target virtual machine.

12. A method of attesting a virtual trusted platform module, the method comprising:
providing, by a virtual machine that is hosted by a source host operating system that runs on a source host, a guest endorsement key certificate and guest measurements to a guest attestation service, the guest endorsement key certificate including a guest endorsement key associated with the virtual trusted platform module that is hosted by the source host operating system, the guest endorsement key certificate vouching for the guest measurements, the guest measurements indicating attributes of a guest operating system that runs on the virtual machine;

receiving, by the virtual machine, a verification from the guest attestation service, the verification indicating that the guest measurements are trustworthy based at least in part on the guest endorsement key certificate being issued via a chain of trust that includes a host attestation service that is configured to attest the source host;

migrating the virtual machine from the source host to a target host; and obtaining, by the virtual machine hosted by a target operating system that runs on the target host, a second guest endorsement key certificate that is issued via a chain of trust that includes a second host attestation service that is configured to attest the target host, the second guest endorsement key certificate including the guest endorsement key, the second guest endorsement key certificate vouching for the guest measurements.

13. The method of claim 12, further comprising:
providing, by the virtual machine hosted by the target operating system, the second guest endorsement key certificate and the guest measurements to the guest attestation service; and
receiving, by the virtual machine hosted by the target operating system, a second verification from the guest attestation service, the second verification indicating that the guest measurements are trustworthy based at least in part on the second guest endorsement key certificate being issued via the chain of trust that includes the second host attestation service.

14. The method of claim 13, further comprising:
providing, by the target host operating system, a host endorsement key certificate and host measurements to the second host attestation service, the host endorsement key certificate vouching for the host measurements, the host measurements indicating attributes of the target host operating system; and
receiving, by the target host operating system, a host signing key certificate from the second host attestation service based at least in part on the host endorsement key certificate and the host measurements being provided to the second host attestation service, the host signing key certificate including a public portion of a host signing key that corresponds to a private portion of the host signing key that is used to sign the second guest endorsement key certificate.

15. The method of claim 14, wherein providing the second guest endorsement key certificate and the guest measurements to the guest attestation service comprises:
providing, by the virtual machine hosted by the target operating system, the second guest endorsement key certificate, the guest measurements, and the host signing key certificate to the guest attestation service; and
wherein receiving the second verification comprises:
receiving, by the virtual machine hosted by the target operating system, the second verification from the guest attestation service based at least in part on the second guest endorsement key certificate, the guest measurements, and the host signing key certificate being provided to the guest attestation service by the virtual machine hosted by the target operating system.

16. The method of claim 13, further comprising:
providing, by the virtual machine hosted by the target operating system, the guest endorsement key to the second host attestation service; and
receiving, by the virtual machine hosted by the target operating system, the second guest endorsement key certificate from the second host attestation service.

17. A method of attesting a virtual trusted platform module, the method comprising:
providing, by a source virtual machine that is hosted by a source host operating system that runs on a source host, a guest endorsement key certificate and guest measurements to a guest attestation service,
the guest endorsement key certificate including a guest endorsement key associated with the virtual trusted platform module that is hosted by the source host operating system,
the guest endorsement key certificate vouching for the guest measurements,
the guest measurements indicating attributes of a guest operating system that runs on the source virtual machine;
receiving, by the source virtual machine, a verification from the guest attestation service, the verification indicating that the guest measurements are trustworthy based at least in part on the guest endorsement key certificate being issued via a chain of trust that includes a host attestation service that is configured to attest the source host;
shutting down the guest operating system on the source virtual machine;
restarting the guest operating system on a target virtual machine that is hosted by a target host operating system that runs on a target host; and
obtaining, by the target virtual machine, a second guest endorsement key certificate that is issued via a chain of trust that includes a second host attestation service that is configured to attest the target host,
the second guest endorsement key certificate including the guest endorsement key,
the second guest endorsement key certificate vouching for the guest measurements; and
wherein the virtual trusted platform module is migrated from the source host operating system to the target host operating system based at least in part on the guest operating system being shut down on the source virtual machine and being restarted on the target virtual machine.

18. The method of claim 17, further comprising:
providing, by the target virtual machine, the second guest endorsement key certificate and the guest measurements to the guest attestation service; and
receiving, by the target virtual machine, a second verification from the guest attestation service, the second verification indicating that the guest measurements are trustworthy based at least in part on the second guest endorsement key certificate being issued via the chain of trust that includes the second host attestation service.

19. The method of claim 18, further comprising:
providing, by the target host operating system, a host endorsement key certificate and host measurements to the second host attestation service, the host endorsement key certificate vouching for the host measurements, the host measurements indicating attributes of the target host operating system; and receiving, by the target host operating system, a host signing key certificate from the second host attestation service based at least in part on the host endorsement key certificate and the host measurements being provided to the second host attestation service, the host signing key certificate including a public portion of a host signing key that corresponds to a private portion of the host signing key that is used to sign the second guest endorsement key certificate.

20. The method of claim 18, wherein providing the second guest endorsement key certificate and the guest measurements to the guest attestation service comprises:

providing, by the target virtual machine, the second guest endorsement key certificate, the guest measurements, and a host signing key certificate to the guest attestation service; and wherein receiving the second verification comprises:

receiving, by the target virtual machine, the second verification from the guest attestation service based at least in part on the second guest endorsement key certificate, the guest measurements, and the host signing key certificate being provided to the guest attestation service by the target virtual machine.

* * * * *